(12) United States Patent
Ren et al.

(10) Patent No.: US 11,762,568 B2
(45) Date of Patent: Sep. 19, 2023

(54) STORAGE SYSTEM CONTROL

(71) Applicant: MICROSOFT TECHNOLOGY LICENSING, LLC, Redmond, WA (US)

(72) Inventors: Jinglei Ren, Beijing (CN); Thomas Moscibroda, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/494,449

(22) PCT Filed: Mar. 16, 2017

(86) PCT No.: PCT/CN2017/077000
§ 371 (c)(1),
(2) Date: Sep. 16, 2019

(87) PCT Pub. No.: WO2018/165958
PCT Pub. Date: Sep. 20, 2018

(65) Prior Publication Data
US 2020/0089406 A1 Mar. 19, 2020

(51) Int. Cl.
*G06F 11/14* (2006.01)
*G06F 3/06* (2006.01)

(52) U.S. Cl.
CPC ............ *G06F 3/064* (2013.01); *G06F 3/0619* (2013.01); *G06F 3/0653* (2013.01);
(Continued)

(58) Field of Classification Search
CPC ...... G06F 3/0614; G06F 3/0619; G06F 3/064; G06F 3/0653; G06F 3/0659; G06F 3/0689; G06F 11/1471; G06F 2201/82
(Continued)

(56) References Cited

U.S. PATENT DOCUMENTS

| 6,173,293 B1 | 1/2001 | Thekkath et al. |
| 6,219,800 B1 | 4/2001 | Johnson et al. |

(Continued)

FOREIGN PATENT DOCUMENTS

| CN | 103229165 A | 7/2013 |
| CN | 104809032 A | 7/2015 |

(Continued)

OTHER PUBLICATIONS

International Search Report and Written Opinion for PCT/CN2017/077000, dated Dec. 22, 2017.
(Continued)

*Primary Examiner* — Ilwoo Park

(57) ABSTRACT

A method for controlling a redundant storage system is proposed. A write request to a redundant storage system is received (310). A dataset that is to be written into the redundant storage system by the write request is determined (320). A portion of the dataset is logged into the redundant storage system for data recovery in case that a fault occurs in the redundant storage system (330). Thus, only a portion of the dataset is logged and the amount of the logged data may be reduced compared with the conventional redundant storage system. Further, the redundant storage system may be recovered in response to a fault occurring in the redundant storage system.

20 Claims, 8 Drawing Sheets

(52) U.S. Cl.
CPC .......... *G06F 3/0659* (2013.01); *G06F 3/0689* (2013.01); *G06F 11/1471* (2013.01); *G06F 2201/82* (2013.01)

(58) Field of Classification Search
USPC ....... 711/114; 714/6.22–6.24, 15, 20; 710/74
See application file for complete search history.

(56) References Cited

U.S. PATENT DOCUMENTS

| | | | |
|---|---|---|---|
| 6,721,863 B1* | 4/2004 | Endo .................... | G06F 3/0676 711/100 |
| 2003/0120864 A1 | 6/2003 | Lee et al. | |
| 2010/0017650 A1 | 1/2010 | Chin et al. | |
| 2012/0079318 A1 | 3/2012 | Colgrove et al. | |
| 2012/0233417 A1 | 9/2012 | Kalach et al. | |
| 2013/0055012 A1 | 2/2013 | Roh | |
| 2013/0124776 A1* | 5/2013 | Hallak ................ | G06F 11/1008 711/102 |
| 2013/0246707 A1* | 9/2013 | Bourbonnais et al. ....... | G06F 11/1076 711/114 |
| 2013/0262920 A1 | 10/2013 | Jung et al. | |
| 2014/0143636 A1 | 5/2014 | Frost et al. | |
| 2014/0244952 A1 | 8/2014 | Raj et al. | |
| 2014/0281801 A1 | 9/2014 | Meir et al. | |
| 2015/0135006 A1 | 5/2015 | Samanta et al. | |
| 2015/0370716 A1* | 12/2015 | Patel .................... | G06F 3/0608 711/113 |
| 2016/0217038 A1* | 7/2016 | Bonwick ............... | G06F 3/0619 |
| 2016/0259693 A1* | 9/2016 | Sundararaman .... | G06F 16/2365 |
| 2017/0228388 A1* | 8/2017 | Venkat .................... | G06F 3/067 |

FOREIGN PATENT DOCUMENTS

| | | |
|---|---|---|
| CN | 105376307 A | 3/2016 |
| CN | 105808376 A | 7/2016 |
| CN | 106255953 A | 12/2016 |

OTHER PUBLICATIONS

"Extended Search Report Issued in European Patent Application No. 17901142.4", dated Nov. 3, 2020, 12 Pages.
"Dell PowerEdge RAID Controller (PERC)", Retrieved From: https://web.archive.org/web/20161219074344/http://www.dell.com/learn/us/en/04/campaigns/dell-raid-controllers, Dec. 19, 2016, 4 Pages.
"Intel RAID Controllers", Retrieved From: https://web.archive.org/web/20161202045452/http://www.intel.in/content/www/in/en/servers/raid/intel-raid-controllers.html#close, Dec. 2, 2016, 5 Pages.
"Introducing Intel® Optane™ Technology—Bringing 3D XPoint™ Memory to Storage and Memory Products", Retrieved From: https://web.archive.org/web/20160721012120/https://newsroom.intel.com/press-kits/introducing-intel-optane-technology-bringing-3d-xpoint-memory-to-storage-and-memory-products/, Jul. 23, 2015, 6 Pages.
"Overview of Disk Management", Retrieved From: https://docs.microsoft.com/en-us/previous-versions/tn-archive/dd163558(v=technet.10)?redirectedfrom=MSDN, Jan. 24, 2014, 7 Pages.
"Persistent Memory Programming", Retrieved From: https://web.archive.org/web/20161128052021/http://pmem.io/, Nov. 28, 2016, 2 Pages.
"Why IBM z Mainframe Server Hardware?", Retrieved From: https://web.archive.org/web/20161202094910/http://www-03.ibm.com/systems/z/hardware/, Dec. 2, 2016, 2 Pages.
Akinaga, et al., "Resistive Random Access Memory (ReRAM) Based on Metal Oxides", In Proceedings of the IEEE, vol. 98, Issue 12, Dec. 2010, pp. 2237-2251.
Alvarez, et al., "Tolerating Multiple Failures in RAID Architectures with Optimal Storage and Uniform Declustering", In Proceedings of the 24th Annual International Symposium on Computer Architecture, Jun. 2, 1997, pp. 62-72.

Apalkov, et al., "Spin-Transfer Torque Magnetic Random Access Memory (STT-MRAM)", In ACM Journal on Emerging Technologies in Computing Systems (JETC), vol. 9, Issue 2, Article 13, May 2013, 35 Pages.
Arpaci-Dusseau, et al., "Operating Systems: Three Easy Pieces", Retrieved From: https://web.archive.org/web/20161125144248/https://pages.cs.wisc.edu/~remzi/OSTEP/, Mar. 2015, 3 Pages.
Arulraj, et al., "Let's Talk About Storage & Recovery Methods for Non-Volatile Memory Database Systems", In Proceedings of the ACM SIGMOD International Conference on Management of Data, May 31, 2015, pp. 707-722.
Zhou, et al., "A Durable and Energy Efficient Main Memory Using Phase Change Memory Technology", In Proceedings of the 36th Annual International Symposium on Computer Architecture, Jun. 20, 2009, pp. 14-23.
Bornholt, et al., "Specifying and Checking File System Crash-Consistency Models", In Proceedings of the Twenty-First International Conference on Architectural Support for Programming Languages and Operating Systems, Apr. 2, 2016, 16 Pages.
Caulfield, et al., "Moneta: A High-Performance Storage Array Architecture for Next-Generation, Non-volatile Memories", In Proceedings of the 43rd Annual IEEE/ACM International Symposium on Microarchitecture, Dec. 4, 2010, pp. 385-395.
Chatzistergiou, et al., "REWIND: Recovery Write-Ahead System for In-Memory Non-Volatile Data-Structures", In Proceedings of the VLDB Endowment, vol. 8, No. 5, Jan. 2015, pp. 497-508.
Chen, et al., "TPC-E vs. TPC-C: Characterizing the New TPC-E Benchmark via an I/O Comparison Study", In Journal of ACM SIGMOD Record, vol. 39, Issue 3, Sep. 2010, pp. 5-10.
Coburn, et al., "NV-Heaps: Making Persistent Objects Fast and Safe with Next-Generation, Non-Volatile Memories", In Proceedings of the 16th International Conference on Architectural Support for Programming Languages and Operating Systems, Mar. 5, 2011, pp. 105-117.
Cooper, et al., "Benchmarking Cloud Serving Systems with YCSB", In Proceedings of the 1st ACM Symposium on Cloud Computing, Jun. 10, 2010, pp. 143-154.
Dabek, et al., "Event-driven Programming for Robust Software", In Proceedings of the 10th ACM SIGOPS European Workshop, Jul. 1, 2002, pp. 186-189.
Denehy, et al., "Journal-guided Resynchronization for Software RAID", In Proceedings of the 4th Conference on USENIX Conference on File and Storage Technologies, Dec. 13, 2005, pp. 87-100.
Dewitt, et al., "Implementation Techniques for Main Memory Database Systems", In Proceedings of the ACM SIGMOD International Conference on Management of Data, Jun. 18, 1984, 8 Pages.
Dragojevic, et al., "FaRM: Fast Remote Memory", In Proceedings of the 11th USENIX Symposium on Networked Systems Design and Implementation, Apr. 2, 2014, pp. 401-414.
Dragojevic, et al., "No Compromises: Distributed Transactions with Consistency, Availability, and Performance", In Proceedings of the 25th Symposium on Operating Systems Principles, Oct. 4, 2015, pp. 54-70.
Dulloor, et al., "System Software for Persistent Memory", In Proceedings of the Ninth European Conference on Computer Systems, Apr. 13, 2014, 15 Pages.
Hay, et al., "Preventing PCM Banks from Seizing Too Much Power", In Proceedings of the 44rd Annual IEEE/ACM International Symposium on Microarchitecture, Dec. 3, 2011, pp. 186-195.
Huang, et al., "Erasure Coding in Windows Azure Storage", In Proceedings of the USENIX Conference on Annual Technical Conference, Jun. 13, 2012, 12 Pages.
Huang, et al., "NVRAM-Aware Logging in Transaction Systems", In Proceedings of the VLDB Endowment, vol. 8, Issue 4, Dec. 1, 2014, pp. 389-400.
Jiang, et al., "A Low Power and Reliable Charge Pump Design for Phase Change Memories", In Proceeding of the 41st Annual International Symposium on Computer Architecture, Jun. 14, 2014, pp. 397-408.
Johnson, et al., "CRL: High-Performance All-Software Distributed Shared Memory", In Proceedings of the Fifteenth ACM Symposium on Operating System Principles, Dec. 3, 1995, pp. 213-228.

(56) References Cited

OTHER PUBLICATIONS

Kim, et al., "NVWAL: Exploiting NVRAM in Write-Ahead Logging", In Proceedings of the Twenty-First International Conference on Architectural Support for Programming Languages and Operating Systems, Apr. 2, 2016, pp. 385-398.

Kolli, et al., "High-Performance Transactions for Persistent Memories", In Proceedings of the Twenty-First International Conference on Architectural Support for Programming Languages and Operating Systems, Apr. 2, 2016, pp. 399-411.

Kultursay, et al., "Evaluating STT-RAM as an Energy-Efficient Main Memory Alternative", In Proceedings of International Symposium on Performance Analysis of Systems and Software, Apr. 21, 2013, pp. 256-267.

Lee, et al., "Architecting Phase Change Memory as a Scalable Dram Alternative", In Proceedings of 36th Annual International Symposium on Computer Architecture, Jun. 20, 2009, pp. 2-13.

Lee, et al., "Phase-Change Technology and the Future of Main Memory", In Journal of IEEE Micro, vol. 30, Issue 1, Jan. 2010, pp. 131-141.

Lee, et al., "Unioning of the Buffer Cache and Journaling Layers with Non-volatile Memory", In Proceedings of the 11th USENIX conference on File and Storage Technologies, Feb. 12, 2013, pp. 73-80.

Lev, et al., "Split Hardware Transactions True Nesting of Transactions using Best-Effort Hardware Transactional Memory", In Proceedings of the 13th ACM SIGPLAN Symposium on Principles and Practice of Parallel Programming, Feb. 20, 2008, pp. 197-206.

Li, Shaohua, "Improving Software RAID with a Write-ahead Log", Retrieved From: https://engineering.fb.com/2015/12/28/core-data/improving-software-raid-with-a-write-ahead-log/, Dec. 28, 2015, 6 Pages.

Lim, et al., "Disaggregated Memory for Expansion and Sharing in Blade Servers", In Proceedings of 36th International Symposium on Computer Architecture, Jun. 20, 2009, pp. 267-278.

Lim, et al., "System-Level Implications of Disaggregated Memory", In Proceedings of the IEEE 18th International Symposium on High-Performance Computer Architecture, Feb. 25, 2012, 12 Pages.

Lynn, et al., "Non-Volatile Cache for Host-Based RAID Controllers", In Technical White Paper of Dell, Jan. 2011, 14 Pages.

Ma, et al., "RAIDShield: Characterizing, Monitoring, and Proactively Protecting Against Disk Failures", In Journal of ACM Transactions on Storage, vol. 11, Issue 4, Article 17, Nov. 2015, 28 Pages.

Meaney, et al., "IBM zEnterprise Redundant Array of Independent Memory Subsystem", In IBM Journal of Research and Development, vol. 56, Issue 1.2, Jan. 2012, 11 Pages.

Mohan, et al., "ARIES: A Transaction Recovery Method Supporting Fine-Granularity Locking and Partial Rollbacks Using Write-Ahead Logging", In Journal of ACM Transactions on Database Systems, vol. 17, Issue 1, Mar. 1992, pp. 94-162.

Moraru, et al., "Consistent, Durable, and Safe Memory Management for Byte-addressable Non Volatile Main Memory", In Proceedings of the First ACM SIGOPS Conference on Timely Results in Operating Systems, Nov. 3, 2013, 17 Pages.

Narayanan, et al., "Whole-System Persistence", In Proceedings of the Seventeenth International Conference on Architectural Support for Programming Languages and Operating Systems, Mar. 3, 2012, pp. 401-410.

Park, et al., "Failure-Atomic msync(): A Simple and Efficient Mechanism for Preserving the Integrity of Durable Data", In Proceedings of the 8th ACM European Conference on Computer Systems, Apr. 15, 2013, pp. 225-238.

Patterson, et al., "A Case for Redundant Arrays of Inexpensive Disks (RAID)", In Proceedings of the ACM SIGMOD International Conference on Management of Data, Jun. 1, 1988, pp. 109-116.

Prakash, Ravi, "Improving RAID Performance and Reliability with Non-Volatile Write Journals", In Journal of Cypress Perform, Mar. 2010, 5 Pages.

Proctor, Adrian, "Non-Volatile Memory", In White Paper of Viking Technology, 2012, 8 Pages.

Xu, et al., "NOVA: A Log-Structured File System for Hybrid Volatile/Non-volatile Main Memories", In Proceedings of 14th USENIX Conference on File and Storage Technologies, Feb. 22, 2016, pp. 323-338.

"Common RAID Disk Data Format Specification Version 2.0", In SNIA Technical Position, Mar. 27, 2009, 126 Pages.

"Ext4 Filesystem", Retrieved From: https://www.kernel.org/doc/Documentation/filesystems/ext4.txt, Retrieved Date Jun. 16, 2021, 10 Pages.

"InfiniBand Cards—Overview", Retrieved From: https://web.archive.org/web/20151118031650/http://www.mellanox.com/page/infiniband_cards_overview, Nov. 18, 2015, 4 Pages.

"Linux Raid", Retrieved From: https://web.archive.org/web/20170610000324/https://raid.wiki.kernel.org/index.php/Linux_Raid, Jun. 10, 2017, 4 Pages.

"Oracle Solaris ZFS Administration Guide", Retrieved From: https://docs.oracle.com/cd/E19253-01/819-5461/index.html, 2010, 07 Pages.

Pelley, et al., "Memory Persistency", In Proceeding of the 41st Annual International Symposium on Computer Architecture, Jun. 14, 2014, pp. 265-276.

Prabhakaran, et al., "Transactional Flash", In Proceedings of the 8th USENIX Conference on Operating Systems Design and Implementation, Dec. 8, 2008, pp. 147-160.

Purdy, et al., "Memory Subsystem Technology and Design for the z990 eServer", In IBM Journal of Research and Development, vol. 48, Issue 3.4, May 2004, pp. 367-381.

Qureshi, et al., "Scalable High Performance Main Memory System Using Phase-Change Memory Technology", In Proceedings of the 36th Annual International Symposium on Computer Architecture, Jun. 20, 2009, pp. 24-33.

Raoux, et al., "Phase-Change Random Access Memory: A Scalable Technology", In IBM Journal of Research and Development, vol. 52, Issue 4, Jul. 2008, pp. 465-479.

Rashmi, et al., "A "Hitchhiker's" Guide to Fast and Efficient Data Reconstruction in Erasure-coded Data Centers", In Proceedings of the ACM Conference on SIGCOMM, Aug. 17, 2014, pp. 331-342.

Recio, et al., "A Remote Direct Memory Access Protocol Specification", In Journal of RFC, vol. 5040, Oct. 2007, 66 Pages.

Reed, et al., "Polynomial Codes Over Certain Finite Fields", In Journal of the Society for Industrial and Applied Mathematics, vol. 8, Issue 2, Jun. 1960, pp. 300-304.

Reinders, James, "Transactional Synchronization with Intel® Core™ 4th Generation Processor", In Intel Software Network, Feb. 7, 2012, 3 Pages.

Ren, et al., "ThyNVM: Enabling Software-Transparent Crash Consistency in Persistent Memory Systems", In Proceedings of the 48th International Symposium on Microarchitecture, Dec. 5, 2015, pp. 672-685.

Sears, et al., "Stasis: Flexible Transactional Storage", In Proceedings of the 7th Symposium on Operating Systems Design and Implementation, Nov. 6, 2006, pp. 29-44.

Shah, et al., "Remote Direct Memory Access (RDMA) Protocol Extensions", In Journal of RFC, vol. 7306, Jun. 2014, 34 Pages.

Shen, et al., "Journaling of Journal Is (Almost) Free", In Proceedings of the 12th USENIX Conference on File and Storage Technologies, Feb. 17, 2014, pp. 287-293.

Stodolsky, et al., "Parity Logging Overcoming the Small Write Problem in Redundant Disk Arrays", In Proceedings of the 20th Annual International Symposium on Computer Architecture, May 16, 1993, pp. 64-75.

Talpey, et al., "RDMA Durable Write Commit", Retrieved From: https://datatracker.ietf.org/doc/html/draft-talpey-rdma-commit-00, Feb. 19, 2016, 24 Pages.

Venkataraman, et al., "Consistent and Durable Data Structures for Non-Volatile Byte-Addressable Memory", In Proceedings of the 9th USENIX Conference on File and Storage Technologies, Feb. 15, 2011, 15 Pages.

Volos, et al., "Mnemosyne: Lightweight Persistent Memory", In Proceedings of the Sixteenth International Conference on Architectural Support for Programming Languages and Operating Systems, Mar. 5, 2011, pp. 91-103.

(56) References Cited

OTHER PUBLICATIONS

Wang, et al., "SD-PCM: Constructing Reliable Super Dense Phase Change Memory under Write Disturbance", In Proceedings of the Twentieth International Conference on Architectural Support for Programming Languages and Operating Systems, Mar. 14, 2015, pp. 19-31.

Wei, et al., "Fast In-Memory Transaction Processing using RDMA and HTM", In Proceedings of the 25th Symposium an Operating Systems Principles, Oct. 4, 2015, pp. 87-104.

Xia, et al., "A Tale of Two Erasure Codes in HDFS", In Proceedings of the 13th USENIX Conference on File and Storage Technologies, Feb. 16, 2015, pp. 213-226.

Zhang, et al., "A Study of Application Performance with Non-Volatile Main Memory", In Proceedings of 31st Symposium on Mass Storage Systems and Technologies, May 30, 2015, 10 Pages.

Zhang, et al., "Mojim: A Reliable and Highly-Available Non-Volatile Memory System", In Proceedings of the Twentieth International Conference on Architectural Support for Programming Languages and Operating Systems, Mar. 14, 2015, pp. 3-18.

Zhao, et al., "Kiln: Closing the Performance Gap Between Systems With and Without Persistence Support", In Proceedings of the 46th Annual IEEE/ACM International Symposium on Microarchitecture, Dec. 7, 2013, pp. 421-432.

Barroso, Luiza, "Warehouse-Scale Computing: Entering the Teenage Decade", In Journal of ACM SIGARCH Computer Architecture News, vol. 39, Issue 3, Jun. 6, 2011, recording of presentation located online on the ACM Digital Library at: Warehouse-Scale Computing: Entering the Teenage Decade | ACM SIGARCH Computer Architecture News, duration 51:52.

"First Office Action and Search report Issued in Chinese Patent Application No. 201780088385.3", dated Aug. 26, 2022, 18 Pages.

Wei, et al., "The Design and Implementation of Log-Structured Soft RAID", Published in the China Academic Journal Electronic, Oct. 1, 2004, pp. 26-29.

"Notice of Allowance Issued in Chinese Patent Application No. 201780088385.3", dated Feb. 25, 2023, 4 Pages.

\* cited by examiner

STORAGE SYSTEM CONTROL

This application is a U.S. National Stage Application of PCT/CN2017/077000, filed Mar. 16, 2017, which application is hereby incorporated by reference. To the extent appropriate, a claim of priority is made to the above disclosed application.

BACKGROUND

With the development of data storage techniques, various data storage systems now provide users with higher data storage capacity. Meanwhile, reliability of the data storage systems, such as crash consistency and fault tolerance, is also significantly improved. So far Redundant Array of Independent Disks (RAID) based storage systems have been proposed to increase data access bandwidth and to enhance fault tolerance capability. When one or more storage nodes in the RAID fail, data in failure storage nodes can be recovered from data in other nodes operating normally.

In addition to the increase of data storage capacity and reliability, users also impose greater demands on the responsiveness of data access. In conventional RAID systems, in order to provide the capability of fault tolerance, redundant data related to a data block has to be maintained among the storage nodes in the system. Further, during operations for writing a data block, the data block will be written twice into a log area and a data area of the storage system, respectively, so as to provide the crash consistency mechanism. Additional overheads will be caused in maintaining such a data storage system.

SUMMARY

In accordance with implementations of the subject matter described herein, a new approach for controlling a redundant storage system is proposed. Generally speaking, if a write request to a redundant storage system is received, a dataset that is to be written into the redundant storage system by the write request is determined. A portion of the dataset is logged into the redundant storage system for data recovery in case that a fault occurs in the redundant storage system. With the proposed implementations, only a portion of the dataset is logged and the amount of the logged data may be reduced compared with the conventional redundant storage system. Further, the redundant storage system may be recovered in response to a fault occurring in the redundant storage system.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The details of one or more implementations of the subject matter described herein are set forth in the accompanying drawings and the description below. Other features, aspects, and advantages of the disclosure will become apparent from the description, the drawings, and the claims, wherein:

Throughout the figures, same or similar reference numbers will always indicate same or similar elements.

DETAILED DESCRIPTION

Principle of the subject matter described herein will now be described with reference to some example implementations. It is to be understood that these implementations are described only for the purpose of illustration and help those skilled in the art to understand and implement the subject matter described herein, without suggesting any limitations as to the scope of the disclosure. The disclosure described herein can be implemented in various manners other than the ones describe below.

As used herein, the term "include" and its variants are to be read as open terms that mean "include, but is not limited to." The term "based on" is to be read as "based at least in part on". The term "a" is to be read as "one or more" unless otherwise specified.

The term "one implementation" and "an implementation" are to be read as "at least one implementation". The term "another implementation" is to be read as "at least one other implementation". Moreover, it is to be understood that in the context of the subject matter described herein, the terms "first", "second" and the like are used to indicate individual elements or components, without suggesting any limitation as to the order of these elements. Further, a first element may or may not be the same as a second element. Other definitions, explicit and implicit, may be included below.

Conventionally, a RAID storage system may combine a plurality of storage devices into an array of disks. By providing redundant storage devices, reliability of an entire disk group can significantly exceed a single storage device. Known RAID standards include, for example, RAID 1, RAID 2, RAID 3, RAID 4, RAID 5, RAID 6, RAID 7, and the like. From the perspective of an operating system a disk array including a plurality of storage devices can be considered as a single logical storage unit or disk. By partitioning the disk array into stripes, data may be distributed across a plurality of storage devices, so that low delay and high bandwidth are achieved. Additionally, data can be recovered at least to some extent when some disks are broken.

Figure 1A:
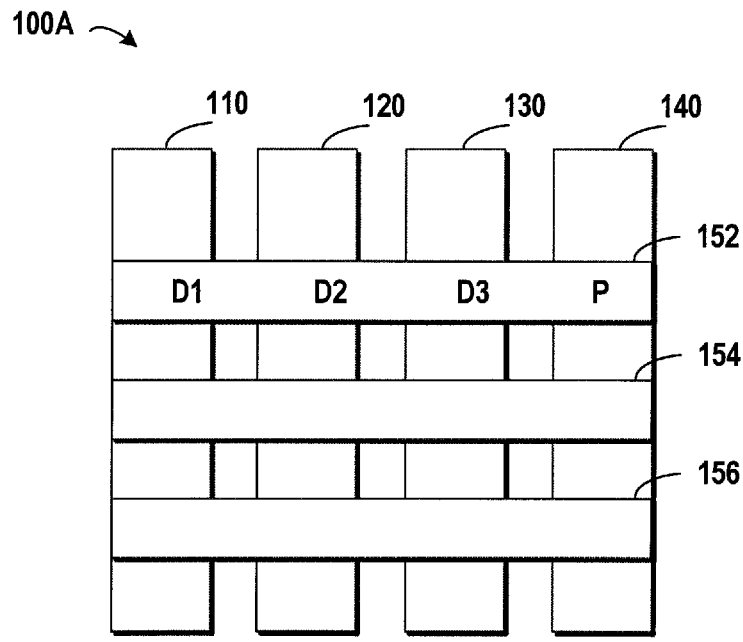
FIG. 1A is a schematic diagram illustrating architecture of a storage system.

FIG. 1A is a schematic diagram illustrating architecture of a redundant storage system. In this figure, working principles of the system are illustrated by taking RAID 4 that includes four independent storage nodes (110, 120, 130 and 140) as an example. It should be noted although in FIG. 1A there are schematically shown four storage nodes, more or less storage nodes may be included according to different standards of RAID in other embodiments. Moreover, although in FIG. 1A there are shown stripes 152, 154 and 156, in other examples the RAID system may further comprise different numbers of stripes.

In RAID, a stripe may cross a plurality of physical storage nodes (for example, stripe 152 crosses storage nodes 110, 120, 130 and 140). The stripe 152 may be construed as a storage area among a plurality of storage nodes which satisfies a given address range. Data stored in stripe 152 may include a plurality of parts: a data block D1 stored in storage node 110, a data block D2 stored in storage node 120, a data block D3 stored in storage node 130, and a data block P stored in storage node 140. In the stripe 152, the data blocks D1, D2 and D3 are used for storing data, and the data block P is used for storing the parity of the data determined from the data blocks D1 to D3.

The data blocks in other stripes 154 and 156 are similar to those in stripe 152, and the difference lies in that the parity of other data blocks in the stripe 154 may be stored in another storage node. In this way, when one of the plurality of storage nodes 110 to 140 fails, data in the failure node may be recovered from other normal storage nodes.

Figure 1B:
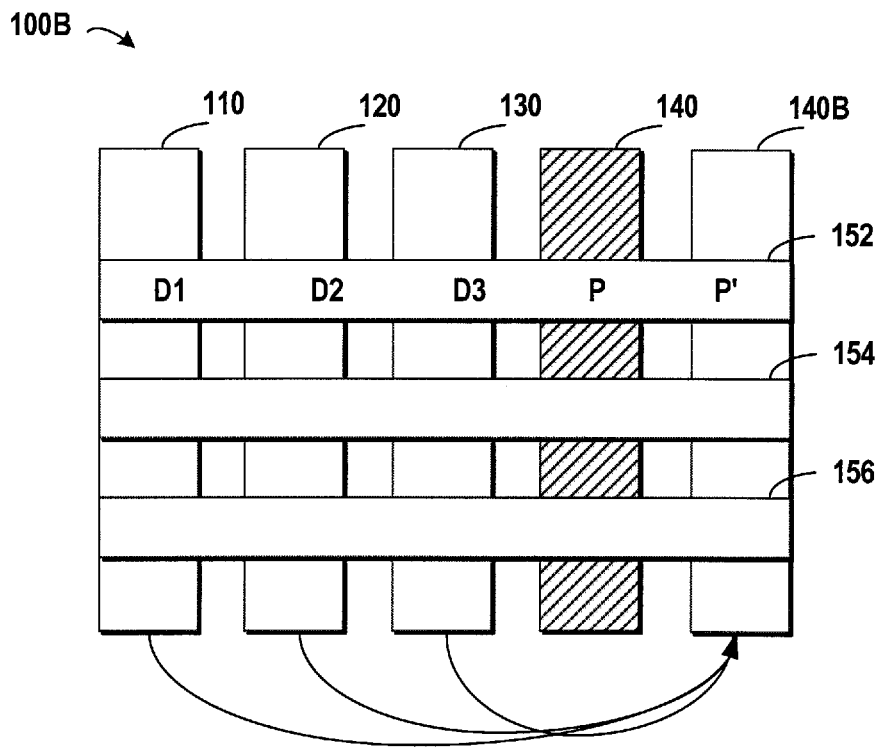
FIG. 1B is a schematic diagram illustrating a data recovery procedure in response to a fault occurring in one of the storage node in the storage system.

FIG. 1B is a schematic diagram illustrating a data recovery procedure in response to a fault occurring in one of the storage node in the storage system. As shown in FIG. 1B, when one storage node (for example, the storage node 140 shown in shadow) fails, data may be recovered from other storage nodes 110, 120, and 130 that are operating normally. At this point, a new backup node 140B may be added to the storage system to replace the failure storage node 140. In this way, the recovered data may be written to 140B to generate a data block P', and thus the storage system may be recovered.

Although the redundant storage system illustrated in FIGS. 1A and 1B may improve the fault tolerance capability, the storage system itself only acts as a low-level physical storage but never handles the crash consistency of data. In processing a write request, data blocks that are to be written into the storage system will be logged in the storage system, which is conventionally the responsibility of an upper-layer filesystem or database. As such, all the associated data blocks will be written twice (so-called "write-twice"), one for logging and the other for the actual updating into the storage node, so that the data blocks will be able to be recovered from the logging data in case any data blocks are corrupted on a system crash. Due to the cost of the logging, the write-twice procedure may result in several drawbacks. In one aspect, the time for processing the write request may be increased and result in additional latency in the processing. In another aspect, the write-twice procedure may write extra data into the storage device and increase the write wear of the storage device. Further, the throughput may be effected due to the write-twice.

In order to at least partially solve the above and other potential problems, a new method and device for controlling a redundant storage system are proposed herein. Hereinafter, the redundant storage system is referred to as "storage system" for short. Insight of the inventors is, considering that both the fault tolerance mechanism and the crash consistency mechanism introduce data redundancy, co-design of the two mechanisms can optimize the reliability of the storage system while minimize the amount of data redundancy. Based on such insight, in implementations of the subject matter described herein, an integrated reliability level of the storage system is proposed, which synergizes the data redundancy from both the fault tolerance mechanism and the crash consistency mechanism. Moreover, based on the integrated reliability level of the storage system, the synergized data redundancy can natively guarantee the crash consistency in addition to the fault tolerance capability provided by the low-level physical storage.

Particularly, according to implementations of the subject matter described herein, upon receipt of a write request to a storage system, a dataset that is to be written into the storage system by the write request is determined. A portion rather than all of the dataset is logged into the storage system for data recovery in case that a fault occurs in the storage system. With the proposed implementations, only a portion of the dataset is logged and the amount of the logged data may be minimized compared with the conventional storage system. Further, the storage system may be recovered in response to a fault occurring in the storage system.

Figure 2:
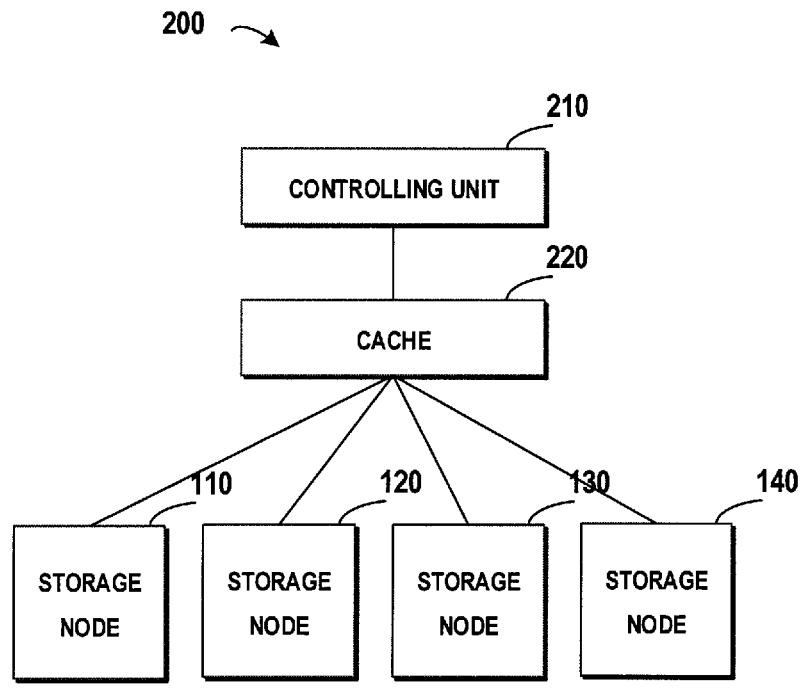
FIG. 2 is a block diagram of architecture of a storage in accordance with an example implementation of the subject matter described herein.

FIG. 2 is a block diagram of architecture 200 of a storage system in accordance with an example implementation of the subject matter described herein. In FIG. 2, four storage nodes 110, 120, 130, and 140 are included in the storage system. These storage nodes may work in a similar manner as that of a RAID 4 storage system, for example. A controlling unit 210 is provided for controlling the operations of the storage system, and a cache 220 is provided for storing intermediate data during storage operations. In other implementations of the subject matter described herein, various numbers of storage nodes and RAID standards may also be adopted.

Figure 3:
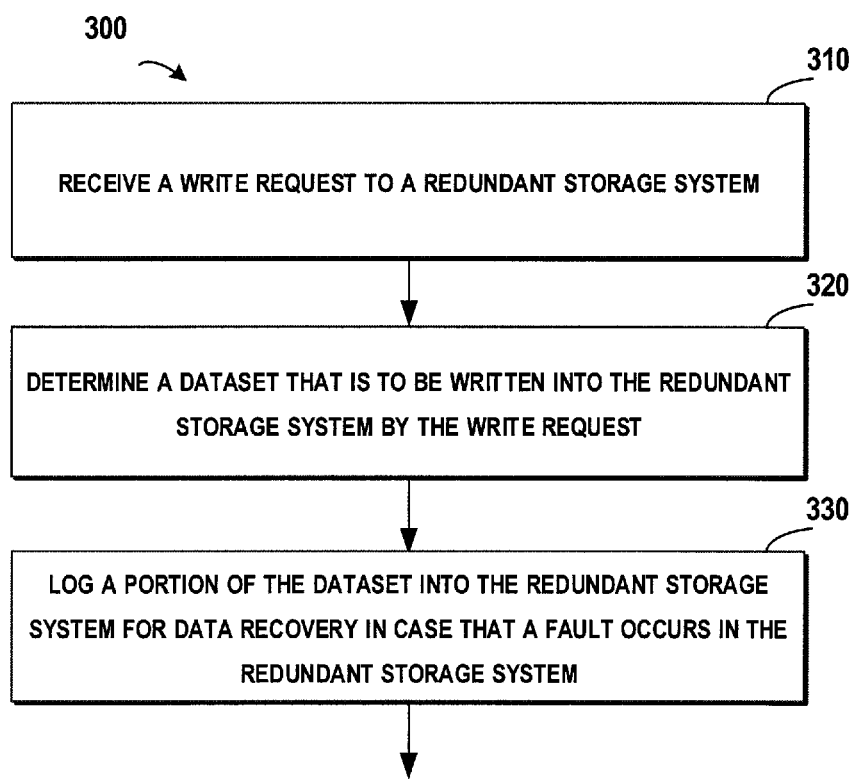
FIG. 3 is a flowchart of an example method for controlling data storage in accordance with an example implementation of the subject matter described herein.

FIG. 3 is a flowchart of an example method 300 for controlling a storage system in accordance with an example implementation of the subject matter described herein. The method 300 may be implemented by the controlling unit 210 as shown in FIG. 2. At 310, a write request to the storage system is received. The write request is a request for writing data into the storage system.

At 320, a dataset to be written into the storage system by the write request is determined. Usually, the write request may indicate the dataset that is to be written into the storage system and a target address to which the data may be written. Accordingly, the dataset may be determined from the write request. For example, in some implementations, a first number of data blocks that are to be written into the storage system may be determined at 320.

At 330, a portion of the dataset is logged into the storage system for data recovery in case that a fault occurs in the storage system. In this way, it is no longer required to log all the dataset in the storage system. Instead, only a portion of the dataset is logged for potential data recovery in case of a fault in the storage system. In some implementations, a second number that is less than the first number may be determined, so that only the second number of data blocks are logged into the storage system.

With the proposed method 300, the amount of data that is to be logged can be reduced and thus the drawbacks of "write-twice" can be alleviated to a certain degree. In turn, the wear of the storage devices and throughput of the storage system can be improved. In the implementations describe above, the data blocks of the second number selected from the data blocks of the first number may be logged into the storage system.

Figure 4:
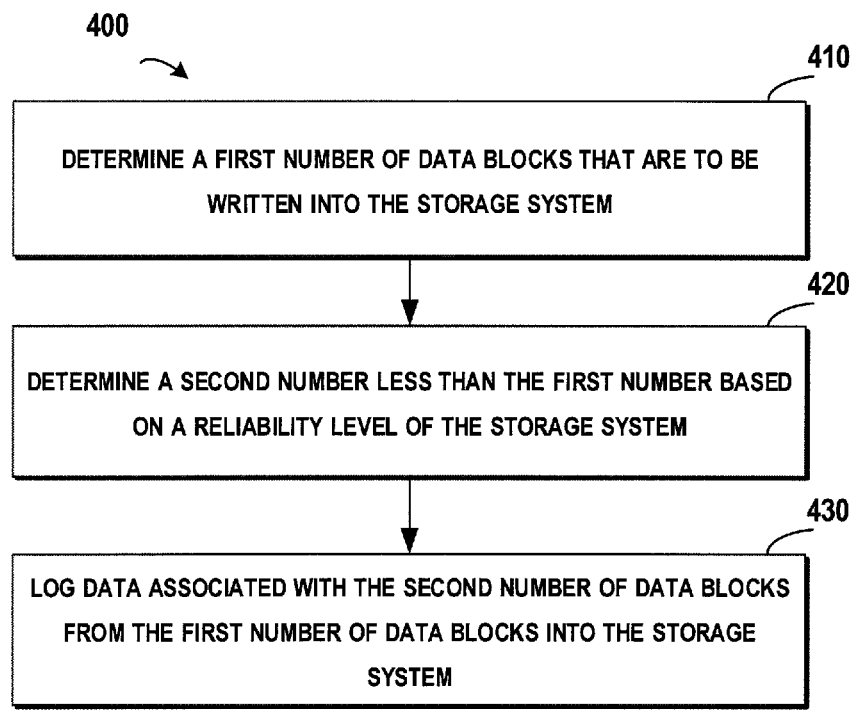
FIG. 4 is a flowchart of an example method for controlling data storage in accordance with an example implementation of the subject matter described herein.

Now an example implementation of the method 300 will be described with reference to FIG. 4 which shows a flowchart of an example method 400 for controlling a storage system. As shown, at 410, a first number (denoted by u) of data blocks is determined from the write request. In some implementations, the first number u may be determined according to the size of the data blocks supported in the storage system. For example, if the write request relates to write 128 KB data into the storage system, and the size of each data block is 32 KB, then u=128/32=4 data blocks should be written into the storage system.

At 420, a second number (denoted by l) less than the first number u is determined based on a reliability level of the storage system. In some implementations, a minimum value of l may be set for different reliability levels of the storage system. For a given reliability level of the storage system, the value of l may then be chosen from one or more values equal to or larger than the minimum value of l determined based on the reliability level. That is, the value of l is defined by the reliability level of the storage system. In the implementations, the values of l may be specified in a variety of ways. For example, as a straightforward way, a lookup table may be predefined for respective values of l in accordance with the reliability levels of the storage system. For other examples, the value of l may be given by a predefined function based on the reliability level of the storage system.

At 430, data associated with the second number of data blocks from the first number of data blocks may be logged into the storage system. First, l data blocks may be selected from the u data blocks. Ways to select the u data blocks from the l data blocks are not limited herein. In one implementation, the l data blocks may be randomly selected; while in other implementations, the first or last l data blocks may be selected from the u data blocks. Further, the data associated with the selected l data blocks may be logged. Based on various types of logging, the data associated with the selected l data blocks may have respective meanings, and details will be described in the following.

In one implementation, if UNDO logging is adopted, the original version in the selected data blocks may be logged. In another implementation, if REDO logging is utilized, the updated version of data that are defined by the write request may be logged. Herein, the original version refers to the original data in the selected data blocks, and the updated version refers to the data that are to be written in the selected data blocks. Details of the logging will be described in the following paragraphs.

As known, usually one or more storage nodes in the storage system are used to store the parity data. Given the reliability level of the system, some of storage nodes are allowed to fail. Accordingly, in some implementations of the subject matter described herein, the number of allowed failure storage nodes in the storage system may be determined based on the reliability level of the storage system. Then the second number may be determined from the number of allowed failure storage nodes. Merely for illustration, example implementations will be described with reference to a RAID storage system as an example.

For the sake of discussion, suppose there includes a third number (denoted by n) of storage nodes in the RAID storage system. Among the n storage nodes, there may be a fourth number (denoted by m) of storage nodes for storing parity. For a stripe, the m storage nodes may store parity for the data in the (n−m) storage nodes. The value of m reflects the fault tolerance ability of the storage system, and when up to m storage nodes fail, the storage system may be recovered. Based on a fault tolerance level of the RAID system under respective RAID standards, the n and m may have respective values. For example, in the RAID 4 as illustrated in FIGS. 1A and 1B, n=4 and m=1. In a RAID 6 system, n=5 and m=2.

For clarity, the number of allowed failure storage nodes in the storage system during the write process is referred to as the fifth number (denoted by f). In the context of the subject matter, the write process here refers to the whole process that is performed in response to receiving the write request, and it starts when the write request is received and ends when the write request is completed. Table 1 illustrates definitions of the indicators described herein, where their values are integer numbers.

TABLE 1

Definitions of Indicators

| No. | Indicators | Names | Definitions |
| --- | --- | --- | --- |
| 1 | u | the first number | The number of data blocks that are to be written into the storage system in response to a write request |
| 2 | l | the second number | The number of data blocks that are to be logged |
| 3 | n | the third number | The number of storage nodes included in the storage system |
| 4 | m | the fourth number | The number of storage nodes used for storing parity for data in (n-m) storage nodes |
| 5 | f | the fifth number | The number of allowed failure storage nodes in the storage system during the write process |

It is to be understood that in the context of the subject matter, the fourth number m and the fifth number f have essentially different meanings. More particularly, m is defined by the nature of the RAID system, whereas f is a customized value for configuring how many failure storage nodes are allowed in the storage system. The value of f reflects a tradeoff between the storage space for the log data and write performance. As a result, it is possible to reduce even minimize the amount of data to be logged by setting f<m.

In the implementations of the subject matter described herein, f is always set to be less than m. Otherwise, if f=m, then all the u data blocks should be logged during the write request and the amount of to-be-logged data are not reduced. If f>m, due to the nature of RAID, the data will not be able to be recovered from a degraded storage system with more than m failure storage nodes.

In some implementations, a redundant array of independent Non-volatile Main Memory (NVMM) storage system (referred to as "RAIN" hereinafter) is proposed, where the RAIN may be based on RAID and accordingly has the same individual fault tolerance levels as RAID by its nature.

Further, atop the fault tolerance level, a desired reliability level may be configured by customizing the number of allowed failure storage nodes in the RAIN storage system. Table 2 illustrates the correspondence of the RAIN and RAID.

TABLE 2

Correspondence between RAIN and RAID

| RAIN LEVEL | FAULT TOLERANCE FOR RAIN | RAID LEVEL | FAULT TOLERANCE FOR RAID | STORAGE SCHEME |
| --- | --- | --- | --- | --- |
| RAIN 1 | f < n − 1 | RAID 1 | n − 1 | Mirroring |
| RAIN 4 | f < 1 | RAID 4 | 1 | Block-level striping with dedicated parity |
| RAIN 5 | f < 1 | RAID 5 | 1 | Block-level striping with rotating parity |
| RAIN 6 | f < 2 | RAID 6 | 2 | Block-level striping with double dedicated/rotating parity |
| RAIN 7 | f < m | RAID 7 | m | Block-level striping with a plurality of dedicated/rotating parity |

In Table 2, the first and third columns indicate the reliability levels of RAIN and RAID, respectively; and the second and fourth columns indicate the fault tolerance for of RAIN and RAID, respectively. Considering the last row of "RAIN 7" as an example, the fault tolerance for RAIN 7 is f, which is less than the value m for RAID 7. At this point, if f out of n storage nodes in RAIN fail, RAIN may be recovered from the failure. The value of f may be specified by user requirements.

Figure 5:
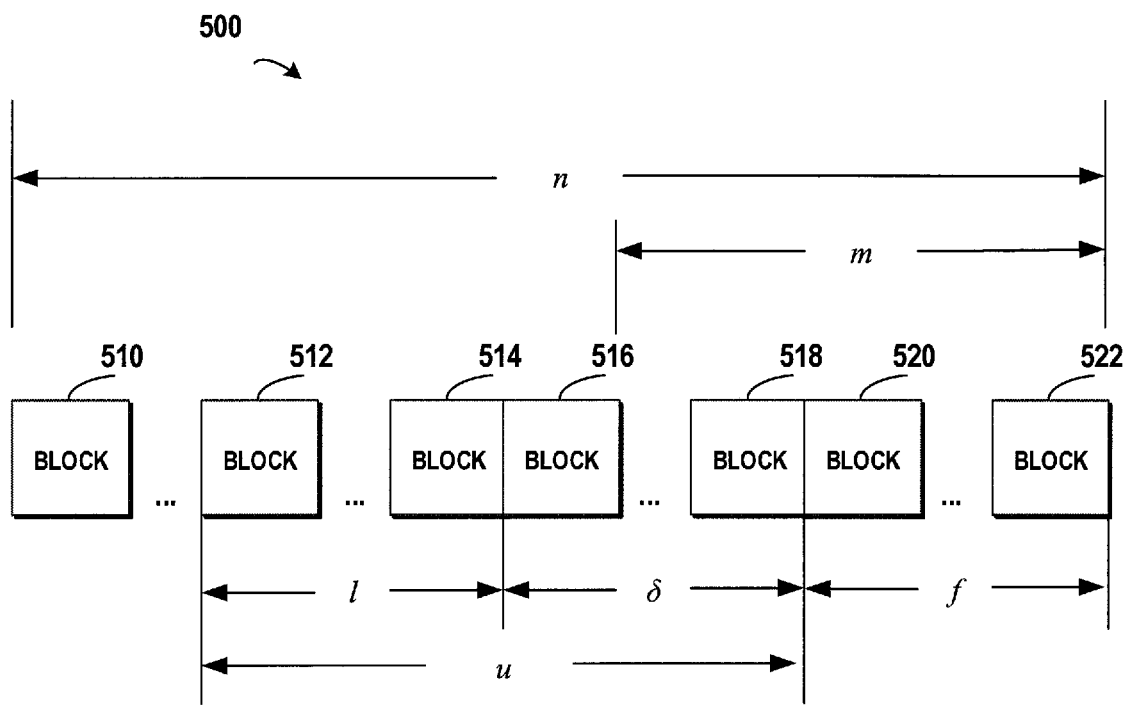
FIG. 5 is a schematic diagram of a relationship between some indicators in accordance with an example implementation of the subject matter described herein.

FIG. 5 is a schematic diagram 500 of a relationship between some indicators in accordance with an example implementation of the subject matter described herein. In this example, the storage system includes n storage nodes, and one or more stripes may be configured across the n storage nodes. For the sake of simplicity, FIG. 5 illustrates a situation where the storage system includes only one stripe and there is only one data block in each of the storage node. At this point, the number of the storage nodes equals to the number of the data blocks, and the number of the data blocks 510, 512, 514, 516, 518, 520 and 522 is n.

In FIG. 5, there are m storage nodes for storing the parity. Out of the total n storage nodes, f failure storage nodes are allowed. It is however to be understood that the schematic diagram in FIG. 5 is for illustrative purpose. The indicators are illustrated to show the relationship between their values, and their positions are merely schematic and should not be limiting. For example, an alternative m storage nodes in which the data blocks 510, . . . , 512 are stored may be used for storing parity data, and the u data blocks to be written may be represented by any other data blocks. Out of the n storage nodes, any storage node, up to f storage nodes but less than m storage nodes, is allowed to be failed. Further, an indicator δ may be set to u−l, as shown in FIG. 5. Accordingly, in response to a write request, δ data blocks may avoid being logged into the storage system such that the storage space for the logging data may be reduced compared to the conventional RAID system.

It is to be noted that though continuous data blocks are illustrated in FIG. 5, the data blocks may in essence be virtual ones and do not have to be as physically continuous in the storage system. Rather, the data block is to be understood as a logical concept, which may be physically stored in any suitable ways among one or more storage nodes in the storage system. In some implementations, RAIN may be organized virtually in a distributed manner, and addresses of the data blocks may be distributed among a plurality of storage nodes at various physical positions.

In some implementations of the subject matter described herein, the values of n, m and f may be determined based on the reliability level of the storage system. Given the reliability level, the corresponding fault tolerance level of RAID may be determined. Then the third number n of storage nodes included in the storage system and the fourth number m of storage nodes used for storing parity may be determined. Further, based on the reliability level, the fifth number f of allowed failure storage nodes in the storage system may be determined, where f is less than m. Having the values of n, m and f determined, the second number l of data blocks to be logged may be determined with respect to the first number u of data blocks to be written into the storage nodes in response to a write request.

It is to be understood that although the subject matter herein describes some implementations by taking an array of NVMMs as the redundant array in the RAIN, it is only an example without suggesting any limitations as to the scope of the subject matter. Any other suitable types of redundant arrays may be used as well, in addition or as alternatives to the disk-based RAID storage system as exemplified above. NVMM, having high availability and high bandwidth as known, can advance the storage performance compared with disks. With that being said, RAIN is however just one of the implementations and should not be considered as an essential element of the subject matter.

In RAID implementations, the storage nodes can be partitioned into a plurality of stripes, and data to be written into the storage nodes upon write request may be distributed across a plurality of stripes. When more than one stripe is involved, the number of data blocks to be written in individual stripes may also be determined from the write request. For every stripe, the write process, including the logging and updating procedures, is performed in a similar way. Details of the implementations will be described with reference to FIGS. 5, 6, 7, 8A and 8B, where the data blocks to be written are within a stripe in the storage system.

In these implementations, a storage node may include a log area for storing the logged data blocks in processing the write request, and a data area for storing the data. Referring to FIG. 5, to log the l data blocks into the storage nodes, the data associated with a given data block of the l data blocks may be logged into the log area of the storage node on which the given data block resides. For example, with respect to the data block 512 in the l data blocks, the data associated with the data block 512 may be logged in the storage node on which the data block 512 resides. For another data block 514 in the l data blocks, the data associated with the data block 514 may be logged in the storage node on which the data block 514 resides.

In some implementations of the subject matter described herein, the data associated with a given data block may have different meanings. If UNDO logging is adopted, the original version in the given data blocks is the data associated with the given data block. In another implementation, if REDO logging is utilized, the updated version of data that will be written by the write request is the data associated with the given data block.

In some implementations of the subject matter described herein, the second number l may be determined based on the following factors: the first number u which represents the number of data blocks that are to be written; the third number n which represents the number of storage nodes included in the storage system; the fourth number in which represents the number of storage nodes used for storing the parity; and the fifth number f which represents the number of allowed failure storage nodes in the storage system, By way of example, in some implementations of the subject matter described herein, the second number may be determined based on the Equation (1) as below:

$$l \geq \begin{cases} 0, & \text{if } n \leq 2m - f \\ u - \min\{2(m-f), u\}, & \text{otherwise} \end{cases} \quad (1)$$

where u represents the first number, l represents the second number, n represents the third number, m represents the fourth number, and f represents the fifth number, as discussed above. Based on the above Equation (1), the value of l may be determined according to the values of u, n, m and f. It is to be understood that Equation (1) is given merely for the purpose of illustration, without suggesting any limitations as to the scope of the subject matter described herein. These factors can be used in any other suitable ways. Alternatively, in other implementations, more or less factors can be taken into account.

Figure 6:
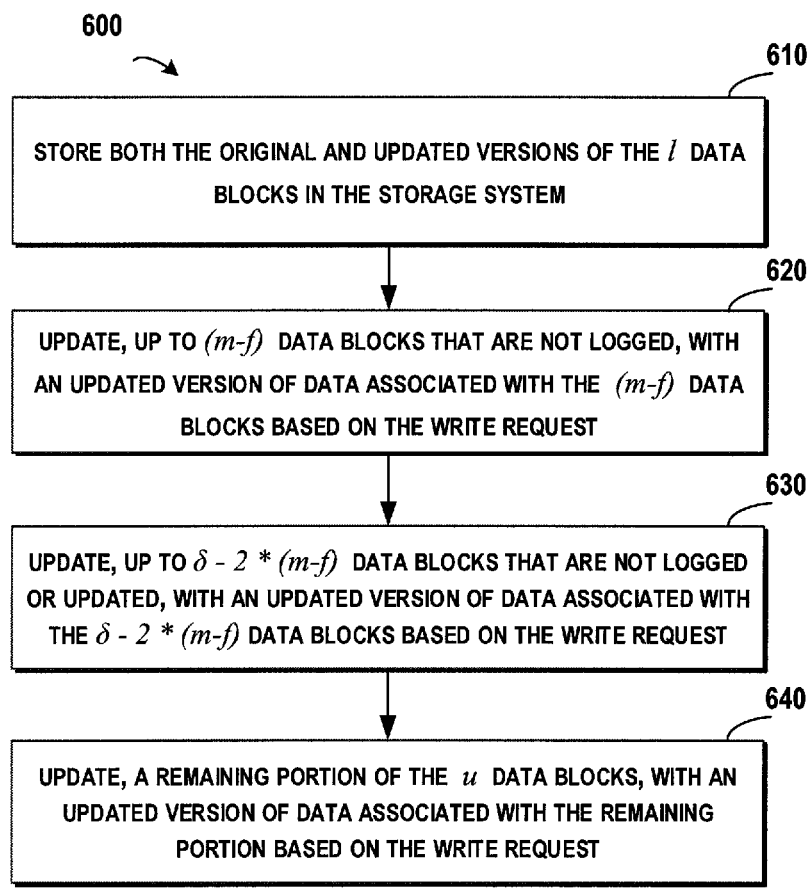
FIG. 6 is a flowchart of an example method for writing data into a stripe of the storage system in accordance with an example implementation of the subject matter described herein.

In response to a fault occurring in the storage nodes during the write process, the data in the failure storage nodes should be able to be recovered based on the log data and the data in the non-failure storage nodes. A fault herein may include a hardware failure, data transmission timeout, and data corruption on a node crash. Since faults may occur in any stage during the write process, the log data and the data in the non-failure storage nodes should be sufficient in any stage when the fault happens so as to recover the data in the failure storage nodes. Under such consideration, in some implementations of the subject matter, a method for writing data into the u data blocks is proposed. FIG. 6 is a flowchart of a method 600 for writing data into a stripe of the storage system in accordance with an example implementation of the subject matter described herein. Based on the method 600, the data can be recovered whenever a fault occurs during the write process insofar as the number of failure storage nodes does not exceed f.

In some implementations of the subject matter described herein, depending on REDO/UNDO logging, either of the original version and the updated version may be logged for data recovery. Specifically, an original version of the data associated with the l data blocks may be determined, and an updated version of the data associated with the l data blocks may be determined based on the write request. Any one version from the original version and the updated version of the data associated with the l data blocks may be logged into the respective log areas in the respective storage nodes of the l data blocks; and the other version of the data associated with the l data blocks may be maintained in the l data blocks.

As illustrated in FIG. 6, at 610, either of the original and the updated versions of the l data blocks is logged. For UNDO logging, the original version may be logged into the log area and the updated version may be written into the l data blocks. For REDO logging, the updated version may be stored into the log area and the original version may be retained in the l data blocks. At this point, regardless of the selected logging policy, both the original and updated versions of the l data blocks are stored in the storage system. Next, in a plurality of phases, the (u−l) data blocks that are not logged may be updated with an updated version of data associated with the (u−l) data blocks based on the write request.

Blocks 620 to 640 in FIG. 6 illustrate details of each of the plurality of phases. At 620, in the first phase of the plurality of phases, based on the write request, up to (m−f) data blocks that are not logged may be updated with an updated version of data associated with the (m−f) data blocks. The (m−f) data blocks may be selected from the (u−l) data blocks that are not logged, in either a random or predefined manner.

At 630, in the second phase of the plurality of phases, in the remaining data blocks that are neither logged nor updated, up to δ−2*(m−f) data blocks may be updated with an updated version of data associated with the (δ−2*(m−f)) data blocks based on the write request, where S=u−l. It is to be understood that if δ−2*(m−f)≤0, then the updating procedure at 630 may be omitted from the method 600.

The rest of the not updated portion of the u data blocks may be updated in the third phase of the plurality of phases. Specifically, at 640, this portion of the u data blocks may be updated with an updated version of data associated with this remaining portion based on the write request. The not updated portion of the u data blocks at this point may include data blocks of Type 1, where Type 1 refers to the remaining portion of the (u−l) data blocks that are neither logged nor updated so far. Further, when REDO logging is utilized, the non-updated portion of the u data blocks may also include data blocks of Type 2, where Type 2 refers to the l data blocks whose updated version are logged in the log area during the logging procedure. With REDO logging, the updated version of the l data blocks is logged while the l data blocks in the data area are still of the original version. Thus the Type 2 data blocks should be updated with the updated version. When the above two types of data blocks are updated, all the data in the u data blocks are updated successfully.

Figure 7:
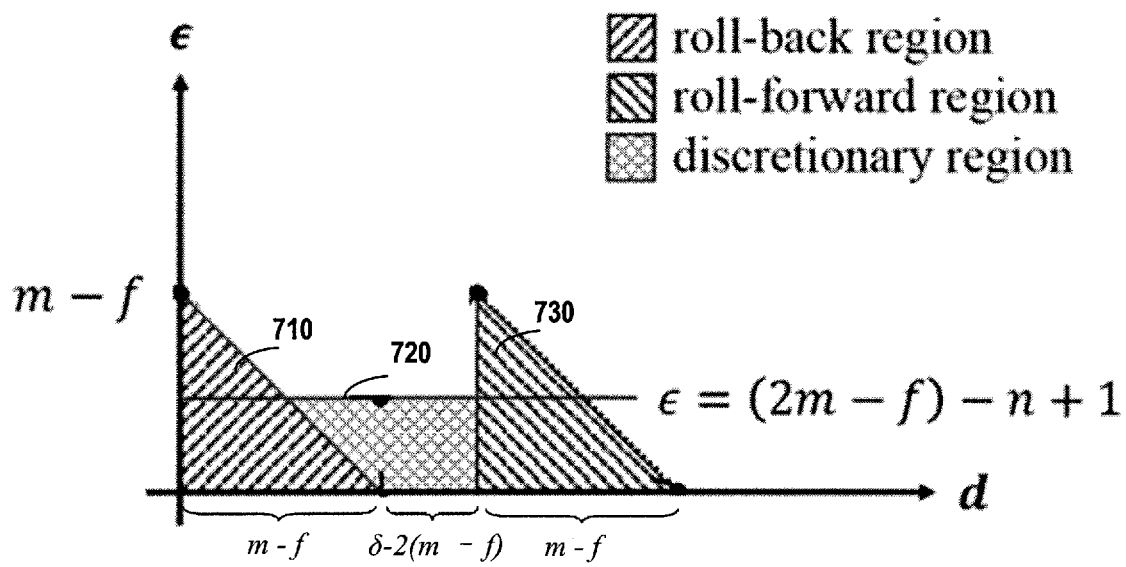
FIG. 7 is a graph demonstrating a safety of the example implementations of the subject matter described herein.

FIG. 7 is a graph demonstrating a safety mechanism of the example implementations of the subject matter described herein. Here the safety means that the implementations of the subject matter can ensure the data recoverability during the write process, even if a fault may occur in any or all of the f storage nodes in the storage system. The safety can be proved with respect to the following two actions:

Action 1. It is safe to log and update the respective l data blocks into respective log areas in the storage nodes in parallel (at this point, the l data blocks may have both the original version and the updated version);

Action 2. It is also safe to update the (u−l) data blocks.

Regarding Action 1, if f<m storage nodes fail, the nature of RAID can ensure that the Action 1 is safe, which will be appreciated by a person skilled in the art and will not be detailed herein.

Regarding Action 2, the (u−l) data blocks may be updated in a plurality of phases and the safety requirement will be met if every phase is safe. This will be explained in detail by referring to FIG. 7 and Table 3 below which shows the states of a stipe during the write procedure. Here, the write procedure refers to the procedure that is performed in each of the plurality of phases for updating the (u−l) data blocks.

TABLE 3

States of Stripe

| State | Number | Version |
|---|---|---|
| not-to-update | n−u | updated/original |
| updated logged | l = u−δ | updated/original |
| updated | d | updated |
| being-updated | $\epsilon$ | — |
| to-be-updated | δ−d−$\epsilon$ | original |

Whenever a fault occurs in the write process, the data need to be recovered (for example, based on roll back or roll forward policy) from the existing data in non-failure storage nodes. In some implementations of the subject matter described herein, in response to a fault occurring in any of the f storage nodes in the storage system, a first group of data blocks with the original version and a second group of data blocks with the updated version may be determined from the existing data, respectively. By comparing the amount of the data blocks included respectively in the two groups, a data recovery policy may be decided, based on which the data may be recovered from the existing data in non-failure storage nodes.

Particularly, for sake of discussion, it is assumed that d data blocks among the (u−l) data blocks have been updated (d=0 indicates the starting state of the Action 2) and E blocks are being updated in an updating procedure, as illustrated by a point (d, $\epsilon$) in FIG. 7, where the horizontal axis represents d and the vertical axis represents $\epsilon$.

Three regions 710, 720 and 730 as illustrated in FIG. 7 correspond to the phases as described at blocks 620, 630 and 640 in FIG. 6, respectively. In the whole roll-back region 710 which corresponds to the first phase at block 620, up to (m−f) data blocks that are not logged may be updated. If the (m−f) data blocks are updated in parallel while f storage nodes fail at this point, there will be totally (m−f)+f=m data blocks unavailable for the data recovery. However, due to the nature of RAID, the data will be able to be recovered from the data available in the rest (n−m) data blocks of the stripe. This proves that it is safe to update up to (m−f) data blocks in parallel in the first phase at block 620. It will be readily understood that the amount of data blocks with the original version are always more than the amount of data blocks with the updated version in the first phase. As a result, the data will be able to be recovered based on the roll back policy.

Likewise, in the whole roll-forward region 730 which corresponds to the third phase at block 640, up to (m−f) data blocks that are neither logged nor updated may be updated.

As explained above, it can be proved that it is safe to update up to (m−f) data blocks in parallel in the third phase at block 640. Once again, since the amount of data blocks with the updated version are always more than the amount of data blocks with the original version in the third phase, the data will be able to be recovered based on the roll forward policy.

Turn to the discretionary region 720 which corresponds to the second phase as described at block 630. In this phase, up to (δ−2*(m−f)) data blocks that are neither logged nor updated may be updated. In the region 720, it is to be determined, from the data available in non-failure storage nodes after the fault, which version of data blocks is the majority, and accordingly which type of data recovery policy is to be used. If there are more original version of data blocks than the updated version of data blocks in the existing data, the data will be able to be recovered based on the roll back policy; otherwise, the data will be able to be recovered based on the roll forward policy.

In the region 720, it is proved that $\epsilon$=(2m−f)−n+1 data blocks may be updated in parallel, as explained in the following. Referring to Equation (1), in extreme cases that l=0 when n≤2m−f, no data blocks at all is logged during the write process. Even in these extreme cases, it can be seen that $\epsilon$=(2m−f)−n+1≥1. This proves it is at least safe to update the data blocks one by one ($\epsilon$=1) until all the (δ−2*(m−f)) data blocks are updated. In any other cases where there are one or more data blocks being logged, a plurality of data blocks ($\epsilon$>1) may be updated in parallel, thus the updating procedure can be accelerated.

In the preceding paragraphs above, implementations are described where more than one data blocks may be updated in parallel in each phase. It is to be understood, however, that in alternative implementations, the data blocks may be updated one by one in each phase. In yet another implementation, in each phase, some data blocks may be updated in serial while the others are updated in parallel.

In order to recover the data after the fault, the number of the data blocks of original version in the existing data may be counted, and the number of the data blocks of updated version in the existing data may also be counted. Based on a comparison of the two numbers, the data blocks with a greater number may be selected as the base for the data recovery. For example, if the first group includes more data blocks than the second group, then the size of the first group is larger than that of the second group and the original version of the data blocks may be used in the recovery. In another example, if the second group includes more data blocks than the first group, then the size of the first group is less than that of the second group and the updated version of the data blocks may be used in the recovery. In still another example, if the sizes of the first and the second groups are the same, then any of the two versions may be used in the recovery.

Figure 8A:
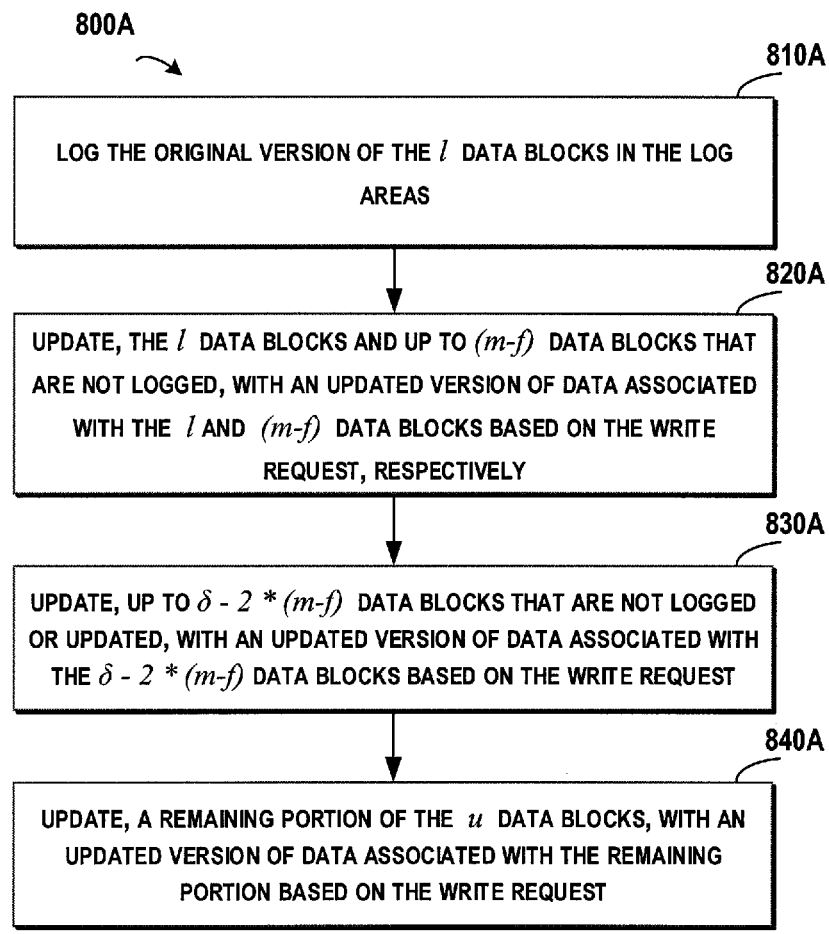
FIG. 8A is a flowchart of an example method for writing data into a stripe of the storage system based on UNDO logging in accordance with an example implementation of the subject matter described herein.

In some implementations of the subject matter described herein, the detailed write procedure based on UNDO logging is different from that based on REDO logging, and the implementations for UNDO logging and REDO logging will be described respectively. Reference will be made to FIG. 8A first, which is a flowchart of an example method 800A for writing data into a stripe of the storage system based on UNDO logging in accordance with an example implementation of the subject matter described herein. At 810A, the original version of the l data blocks may be logged into the log areas. At 820A, based on the write request, the l data blocks and up to (m−f) data blocks that are not logged may be updated with the associated updated version. Further, if δ−2*(m−f)>0, then up to δ−2*(m−f) data blocks that are neither logged nor updated may be updated with an updated version of data associated with the δ−2*(m−f) data blocks based on the write request at 830A. At 840A, a remaining portion of the u data blocks may be updated with an updated version of data associated with the remaining portion based on the write request. It is to be understood that, the original data included in the l data blocks are already replaced with the updated version due to the UNDO logging, only "Type 1" data blocks should be updated at 840A.

Figure 8B:
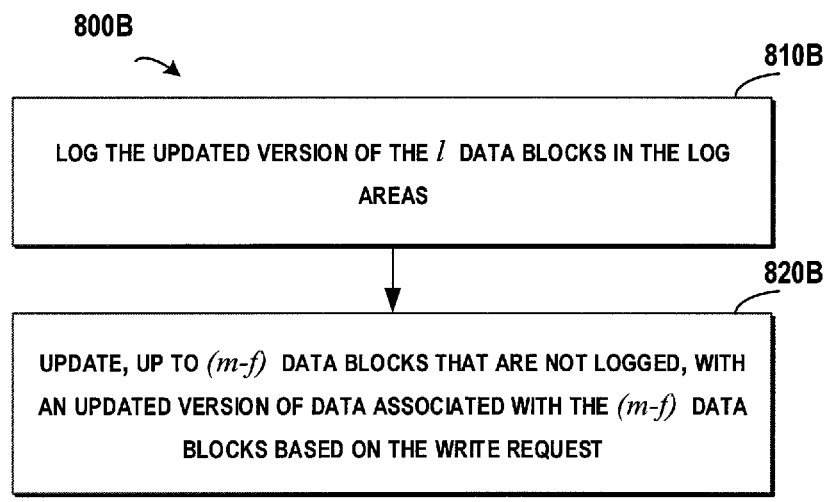
FIG. 8B is a flowchart of an example method for writing data into a stripe of the storage system based on REDO logging in accordance with an example implementation of the subject matter described herein.

FIG. 8B is a flowchart of an example method 800B for writing data into a stripe of the storage system based on REDO logging in accordance with an example implementation of the subject matter described herein. FIG. 8B illustrates only a portion of the write process and the portion not illustrated in FIG. 8B are the same as 830A and 840A in FIG. 8A. In FIG. 8B, as the REDO logging is utilized in the storage system, the updated version of the l data blocks may be logged into the log areas at 810B. At 820B, up to (m−f) data blocks that are not logged may be updated with an updated version of data associated with the (m−f) data blocks based on the write request.

Further, the method 800B may further update the remaining portion of the u data blocks, for example. If δ−2*(m−f)>0, then up to δ−2*(m−f) data blocks that are not logged or updated may be updated with an updated version of data associated with the δ−2*(m−f) data blocks based on the write request. A remaining portion of the u data blocks may be updated with an updated version of data associated with the remaining portion based on the write request. In order to complete the write procedure based on REDO logging, the original data included in the l data blocks (Type 2 data blocks) may be replaced with the updated version. For example, the l data blocks may be updated with the data associated with the write request; alternatively, the l data blocks may be updated with the updated version of data that is logged in the log areas.

In some implementations of the subject matter described herein, if the u data blocks are distributed in a plurality stripes in the storage system, the write request may be parsed to determine the number of stripes and the number of data blocks in each of the stripes that are involved in the write procedure. Usually, the write request may specify the addresses of the u data blocks. Based on the addresses, the specific position (such as the stripe ID and the offset in the stripe) of the u data blocks may be determined.

Generally, the write process with respect to each of the plurality of stripes is similar to what is described in the preceding paragraphs with reference to FIGS. 6, 7, 8A, and 8B. Example implementations in this regard will be described by taking one stripe in the plurality of stripes in the storage system with reference to FIG. 9.

In some implementations of the subject matter described herein, with respect to a stripe of the plurality of stripes, a sixth number of data blocks that are to be written into the stripe may be determined, where $u_i$ represents the sixth number. A seventh number less than $u_i$ may be determined based on the reliability level of the storage system, where $l_i$ represents the seventh number. Data associated with $l_i$ data blocks from the $u_i$ data blocks may be logged into the storage system.

In these implementations, an individual number $u_i$ indicating the number of data blocks that are to be written into each stripe may be determined, and then an individual number $l_i$ indicating the number of data blocks that are to be logged into each stripe may be determined. In each stripe, the respective $l_i$ data blocks may be logged into the log areas of the $l_i$ storage nodes. The individual number $u_i$ for the plurality of stripes may have same or different values, and thus the individual number $l_i$ for the plurality of stripes may also have same or different values. During the write process for each stripe, the logging and updating procedures may be implemented based on the corresponding individual numbers $u_i$ and In some implementations of the subject matter described herein, with respect to the stripe of the plurality of stripes, an original version of the data associated with the $l_i$ data blocks may be determined, and an updated version of the data associated with the $l_i$ data blocks may be determined based on the write request. Further, one version from the original version and the updated version of the data associated with the $l_i$ data blocks may be logged into the respective log areas in the respective storage nodes of the $l_i$ data blocks in the stripe; and the other version of the data associated with the $l_i$ data blocks may be maintained in the $l_i$ data blocks.

In the above implementations, either the UNDO logging or the REDO logging may be used, and thus the procedures for storing both versions are similar to those in the write process in the single stripe. Details of the implementations by using UNDO logging and REDO logging are omitted hereinafter.

Figure 9:
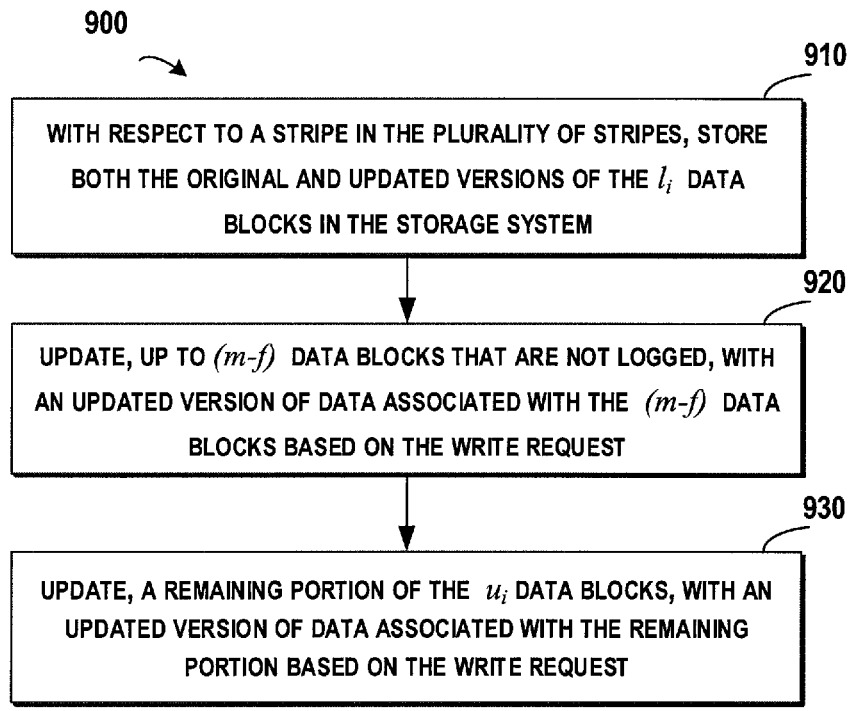
FIG. 9 is a flowchart of an example method for writing data into a stripe of a plurality of stripes in the storage system in accordance with an example implementation of the subject matter described herein.

Now example implementations for writing data into each stripe will be described with reference to FIG. 9, which illustrates a flowchart of an example method 900 for writing data into a stripe of a plurality of stripes in the storage system in accordance with an example implementation of the subject matter described herein.

In some implementations of the subject matter described herein, with respect to the stripe of the plurality of stripes, up to (m−f) data blocks that are not logged may be updated with an updated version of data associated with the (m−f) data blocks based on the write request. As shown in FIG. 9, the updating procedure as illustrated at 920 may be implemented with respect to each of the plurality stripes, and the (m−f) data blocks may be selected randomly from each stripe. For example, in the first stripe, the (m−f) data blocks may be randomly selected from the $u_1$ data blocks; in the second stripe, the (m−f) data blocks may be randomly selected from the $u_2$ data blocks. In these implementations, the (m−f) data blocks in each stripe may be updated.

In some implementations of the subject matter described herein, with respect to the stripe of the plurality of stripes, a remaining portion of the $u_i$ data blocks may be updated with an updated version of data associated with the remaining portion based on the write request. As shown in FIG. 9, when the (m−f) data blocks in each stripe are successfully updated at 920, then at 930, a remaining portion of the $u_i$ data blocks may be updated with an updated version of data associated with the remaining portion based on the write request. The number of data blocks in respective remaining portions in different stripes may be the same or different, and the data blocks in the respective remaining portions may be updated one by one. Alternatively, these data blocks may be updated in parallel.

According to implementations of the subject matter described herein, the updating procedures for the plurality of stripes are completed in the same phase. For example, in the phase in relation to block 920, up to (m−f) data blocks should be updated in each stripe. Only if the updating as illustrated at 920 is successful for all the stripes, the first phase terminates. Then at 930, the remaining portion in each stripe may be updated. If the updating at block 930 is successful for all the stripes, the whole updating procedure is completed.

During operations of the storage system, the fault may occur at any time point in operations at blocks 910, 920 and 930. It is to be understood that the steps in the above write procedure may ensure that the storage system always includes enough data for the recovery even when a fault occurs, and the data may be rolled back to the original version or be rolled forward to the updated version.

Figure 10:
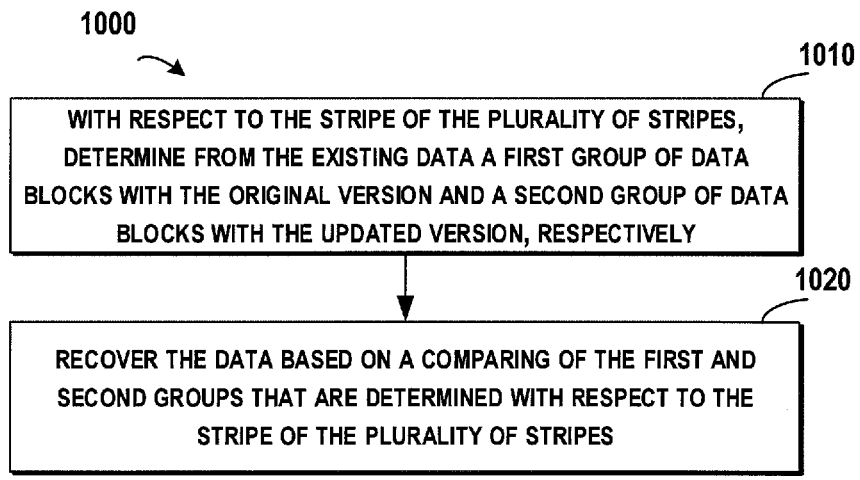
FIG. 10 is a flowchart of an example method for recovering data from a stripe of a plurality of stripes in the storage system in accordance with an example implementation of the subject matter described herein.

In case that the write request updates a plurality of stripes in the storage system, the recovery policy (roll-back or roll-forward) for all the stripes should be the same, such that all the stripes may be recovered to a same version. FIG. 10 is a flowchart of an example method 1000 for recovering data from a stripe of a plurality of stripes in the storage system in accordance with an example implementation of the subject matter described herein. The write process for the plurality of stripes may ensure that the storage system always includes enough data for the recovery even if a fault occurs.

In some implementations of the subject matter described herein, with respect to the stripe of the plurality of stripes, a first group of data blocks with the original version and a second group of data blocks with the updated version may be determined from the existing data, respectively. The data may be recovered by comparing sizes of the first and second groups that are determined with respect to the stripe of the plurality of stripes.

At 1010, from the existing data in each stripe, a first group of data blocks with the original version and a second group of data blocks with the updated version may be determined, respectively. In one example, if the write request relates to two stripes, the data blocks of the original and the updated versions may be counted in each of the two stripes.

At 1020, the data may be recovered based on a comparison of sizes of the first and second groups that are determined with respect to the stripe of the plurality of stripes. If the first stripe includes more blocks of the original version and the second stripe includes equal number of blocks of the two versions, then the original version may be used and the roll-back policy may be adopted for the data recovery. In another example implementation, if the first stripe includes more blocks of the updated version and the second stripe includes equal number of blocks of the two versions, then the updated version may be used and the roll-forward policy may be adopted for the data recovery.

In some implementations of the subject matter described herein, in response to the data blocks of one version from the original and updated versions being missed in the stripe of the existing data, the data in the plurality of stripes may be recovered based on the data blocks with the other from the original and updated versions. In these implementations, if one version from the original and updated versions is missed in one stripe, then the other version may be selected as the base for the data recovery. These implementations reflect an extreme situation where the data blocks of one version is zero.

In some implementations of the subject matter described herein, the storage nodes may be implemented with NVMM. Compared with the hard disk drive, NVMM may provide better accessing speed and other advantages. Accordingly, NVMM proposes new approaches for storing persistent data, and combining the NVMM with the conventional RAID system may provide good fault tolerance, high availability and high bandwidth. Further, the upper layer file system l database on top of the RAID may be also combined with the storage system based on NVMM.

With the conventional RAID, a user of the storage system is required to handle the problems of crash consistency by calling functions of the file system or the database system that are deployed on the top of the RAID. However, with the implementations of the subject matter, both crash consistency and fault tolerance may be achieved, and the redundant data in the storage system may be utilized to a greater extent. Further, the implementations may natively support crash consistency in addition to the conventional fault tolerance in RAID without the reliance on the file system or the database system. In other words, after the user submit a write request to the storage system, all the detailed operations related to the writing and recovering procedures are transparent and need not to be interacted with the user.

In some implementations of the subject matter described herein, the stored data may be removed from the log area in response to the write request being completed. The purpose for logging the l data blocks is to maintain the crash consistency during processing the write request in the storage system. When the write request is completed, the logged data is of no use and may be removed. Alternatively, the logged data may stay in the log area and be replaced by new data associated with a new write request.

Figure 11A:
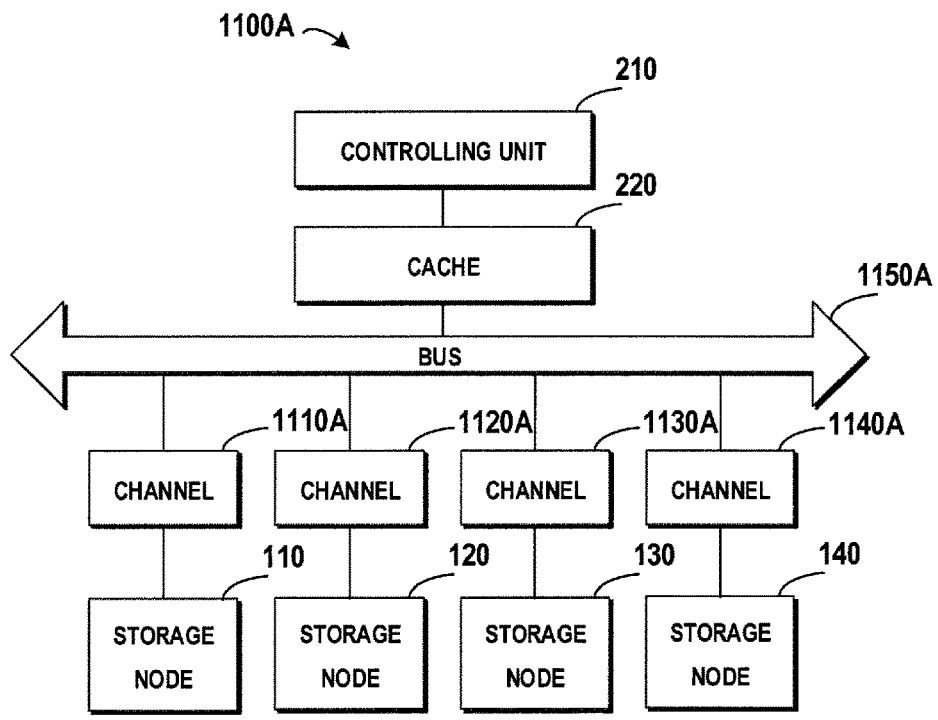
FIGS. 11A, 11B and 11C are block diagrams of architecture of controlling data storage in accordance with various example implementations of the subject matter described herein, respectively.

Implementations of the subject matter described herein may be based on various architectures, and reference will be made to FIGS. 11A, 11B and 11C to describe the details of the implementations. FIG. 11A is a block diagram of architecture 1100A of controlling data storage in accordance with various example implementations of the subject matter described herein.

As shown in FIG. 11A, a Chip-level RAIN is illustrated. By applying RAIN to memory chips, a storage system may be enabled to provide the abilities of crash consistency and fault tolerance. The controlling unit 210 may be implemented by an application by executing instructions in a memory card connected to the bus 1150A. The cache 220 may provide a temporary space for saving the intermediate data in the operations. The respective storage nodes (such as NVMM nodes) 110, 120, 130 and 140 may be connected via respective channels 1110A, 1120A, 1130A, and 1140A to the bus 1150A. Based on the bus 1150A, the controlling unit 210 may access the storage nodes 110 to 140 and perform the methods for data writing and recovering.

Figure 11B:
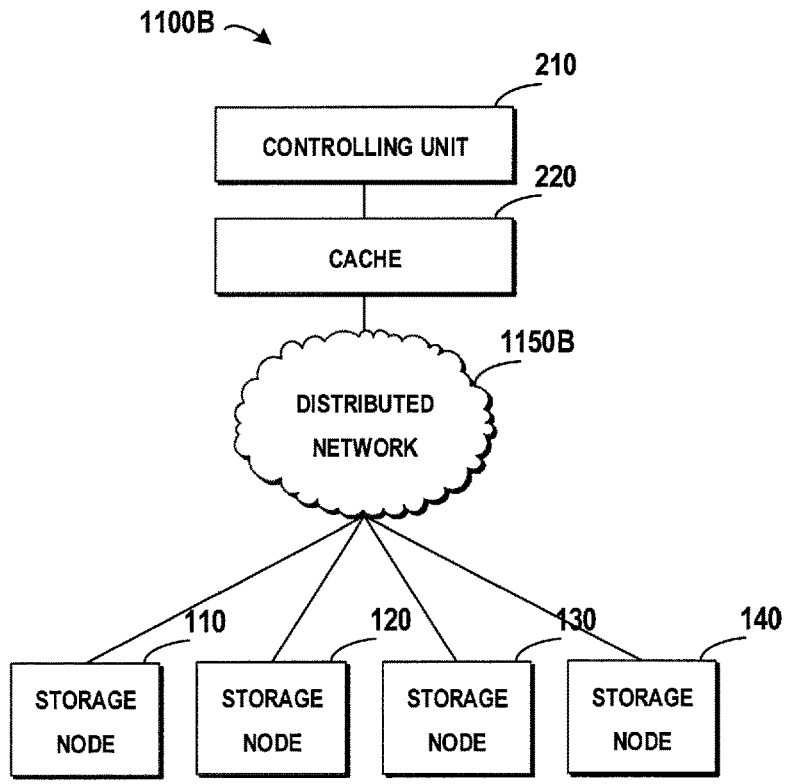

FIG. 11B is a block diagram of architecture 1100B of controlling data storage in accordance with various example implementations of the subject matter described herein. In this example, a Distributed RAIN is shown. The storage nodes such as NVMM nodes 110-140 may be connected to the cache 220 and the controlling unit 210 via a distributed network 1150B. Based on the distributed network 1150B, the controlling unit 210 may access the storage nodes 110 to 140 and perform the methods for writing and recovering the data.

Figure 11C:
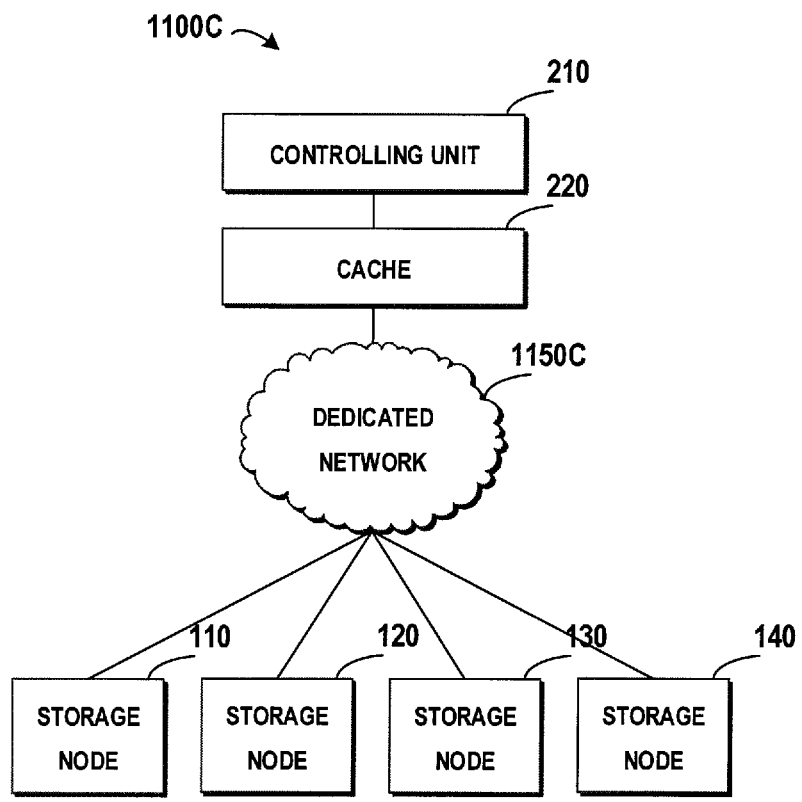

FIG. 11C is a block diagram of architecture 1100C of controlling data storage in accordance with various example implementations of the subject matter described herein. In FIG. 11C, a Disaggregated RAIN is illustrated. The storage nodes (such as NVMM nodes) 110 to 140 may be connected to the cache 220 and the controlling unit 210 via a dedicated network 1150C. Based on the distributed network 1150C, the controlling unit 210 may access the storage nodes 110 to 140 and perform the methods for data writing and recovering.

In this implementation, the NVMM in the storage nodes may be organized as a collective pool. The dedicated network 1150C may utilize high speed ports in the storage nodes 110 to 140 to provide high speed communication within the architecture 1100C. The controlling unit 210 may access the NVMM in the pool at a high speed via the dedicated network 1150C and perform the methods for data writing and recovering.

The following paragraphs will describe some implementations based on RAIN 1, RAIN 4/5, RAIN 6, and RAIN 7, and the advantages for these implementations. With the implementations of the subject matter, several aspects of the storage system, such as latency, wear and throughput, may be improved.

Latency is the theoretical time to complete a write request. The unit of latency is the time to persistently update one data block. If a plurality of blocks are updated in parallel, only one time period is counted for all the data blocks. Wear is the total number of data blocks that are written to any storage node in processing a write request, including the data blocks logged into the log areas. The less write wear is, the longer the storage endurance is. Throughput is the number of write operations executed per time period. It can be determined by dividing the (aggregate) storage bandwidth by the amount of data that one operation writes. A relative value of the throughput may be illustrated in the following paragraphs.

For the same RAIN configuration, these properties are influenced by u as well. We define $u_{max}$ as the number of data blocks to be updated when a whole stripe is written, and $u_{min}$ as the number of data blocks to be updated when only one data block of a stripe is written. In the implementations, $u_{max}=n$ and $u_{min}=m+1$. Performance of the properties of a RAIN configuration is within a range determined by $u_{max}$ and $u_{min}$.

For brevity, UNDO logging is taken as an example, and the performance for REDO logging may be determined in a similar manner. Tables 4 to 7 illustrate the performance of RAIN 1, RAIN 4/5, RAIN 6 and RAIN 7 according to some implementations of the subject matter. In these tables, "RAID+log" refers to a plain logging implementation in a corresponding conventional RAID storage system, without synergy of log and parity. Latency of a write on RAID+log is always 2, because all the data blocks may be logged in parallel in one step, and further all the data blocks may be updated in parallel in another step. Meanwhile, the write wear in a corresponding conventional RAID is always 2u, since every data block should be written twice.

Table 4 illustrates the performance of RAIN 1 according to one implementation of the subject matter.

TABLE 4

Comparison of Performance between RAID 1 and RAIN 1

| u = 3 | f | l | LATENCY | WEAR | THROUGHPUT |
|---|---|---|---|---|---|
| RAID + log | 2 | 3 | 2 | 6 | 1 |
| RAIN | 1 | 0 | 3 | 3 | 2 |

In RAIN 1, each stripe consists of n copies of data. Taking n=3 as an example, without performing a write process, the RAIN 1 may tolerate up to two node failures (m=2), as comparable to the conventional RAID (RAID+log) which maintains the same level of fault tolerance during the write process. Setting f=1 means up to 1 failure storage node is allowed during the write process. In this case, logging may be completely avoided. The write latency of RAIN 1 is 3, which is bigger than that of RAID+log. Meanwhile, since RAIN 1 writes each block only once, half of the write wear may be save compared with RAID+log. Moreover, under a certain total bandwidth, the half-write amount indicates a double throughput. Based on the above, with the implementation of the subject matter, both wear and throughput are improved in RAIN 1 without sacrificing the latency.

Table 5 illustrates the performance of RAIN 4/5 according to one implementation of the subject matter.

TABLE 5

Comparison of Performance between RAID 4/5 and RAIN 4/5

|  | f | l | LATENCY | WEAR | THROUGHPUT |
|---|---|---|---|---|---|
| $u_{max} = 4$ |  |  |  |  |  |
| RAID + log | 1 | 4 | 2 | 8 | 3 |
| RAIN | 0 | 2 | 3 | 6 | 4 |
| $u_{min} = 2$ |  |  |  |  |  |
| RAID + log | 1 | 2 | 2 | 4 | 1 |
| RAIN | 0 | 0 | 2 | 2 | 2 |

RAIN 4/5 share identical parity coding, and every three data blocks plus one parity block make a stripe. Taking f=0 as an example, for a full stripe write (u=4), 2 data blocks may be saved from being logged, and the latency of RAIN 4/5 is 3. 6 data blocks should be written in total, resulting in a saving of 25% compared to RAID+log. For a one-block write (u=2), the latency is only 2, and achieves half-write wear may be achieved. As for the throughput, the throughput for both of $u_{max}$ and $u_{min}$ may be better than the conventional RAID 4/5. During processing the write request in RAIN 4/5, some data blocks may be saved from being logged. Accordingly, the wear and throughput performance of the RAIN 4/5 may be improved to a certain degree.

Table 6 illustrates the performance of RAIN 6 according to one implementation of the subject matter, and Table 7 illustrates the performance of RAIN 7 according to one implementation of the subject matter. Based on the statistic in Tables 6 and 7, by utilizing the implementations of the subject matter, the performance for latency, ware and throughput may be improved.

TABLE 6

Comparison of Performance between RAID 6 and RAIN 6

|  | f | l | LATENCY | WEAR | THROUGHPUT |
|---|---|---|---|---|---|
| $u_{max} = 5$ |  |  |  |  |  |
| RAID + log | 2 | 5 | 2 | 10 | 3 |
| RAIN | 1 | 3 | 3 | 8 | 3.75 |
| $u_{min} = 3$ |  |  |  |  |  |
| RAID + log | 2 | 3 | 2 | 6 | 1 |
| RAIN | 1 | 1 | 3 | 4 | 1.5 |

TABLE 7

Comparison of Performance between RAID 7 and RAIN 7

|  | f | l | LATENCY | WEAR | THROUGHPUT |
|---|---|---|---|---|---|
| $u_{max} = 7$ |  |  |  |  |  |
| RAID + log | 3 | 7 | 2 | 14 | 4 |
| RAIN | 1 | 3 | 3 | 10 | 5.6 |
| $u_{min} = 4$ |  |  |  |  |  |
| RAID + log | 3 | 4 | 2 | 8 | 1 |
| RAIN | 1 | 0 | 2 | 4 | 2 |

Figure 12:
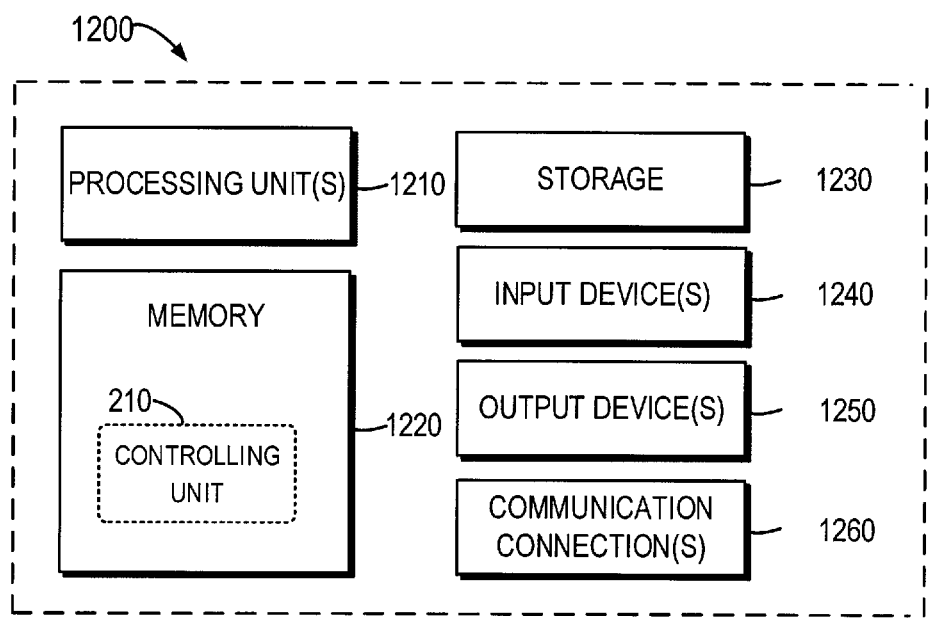
FIG. 12 is a block diagram of a device suitable for implementing one or more implementations of the subject matter described herein.

FIG. 12 is a block diagram of a device suitable for implementing one or more implementations of the subject matter described herein. In these implementations, the device 1200 may be an individual computing for implementing the controlling unit 210. Alternatively, the device 1200 may be a component included in any of the storage nodes 110 to 140. It is to be understood that the device 1200 is not intended to suggest any limitation as to scope of use or functionality of the subject matter described herein, as various implementations may be implemented in diverse general-purpose or special-purpose computing environments.

As shown, the device 1200 includes at least one processing unit (or processor) 1210 and a memory 1220. The processing unit 1210 executes computer-executable instructions and may be a real or a virtual processor. In a multi-processing system, a plurality of processing units execute computer-executable instructions to increase processing power. The memory 1220 may be volatile memory (for example, registers, cache, RAM), non-volatile memory (for example, ROM, EEPROM, flash memory), or some combination thereof.

In the example shown in FIG. 12, the device 1200 further includes storage 1230, one or more input devices 1240, one or more output devices 1250, and one or more communication connections 1260. An interconnection mechanism (not shown) such as a bus, controller, or network interconnects the components of the device 1200. Typically, operating system software (not shown) provides an operating environment for other software executing in the device 1200, and coordinates activities of the components of the device 1200.

The storage 1230 may be removable or non-removable, and may include computer-readable storage media such as flash drives, magnetic disks or any other medium which can be used to store information and which can be accessed within the device 1200. The input device(s) 1240 may be one or more of various different input devices. For example, the input device(s) 1240 may include a user device such as a mouse, keyboard, trackball, etc. The input device(s) 1240 may implement one or more natural user interface techniques, such as speech recognition or touch and stylus recognition. As other examples, the input device(s) 1240 may include a scanning device; a network adapter; or another device that provides input to the device 1200. The output device(s) 1250 may be a display, printer, speaker, network adapter, or another device that provides output from the device 1200. The input device(s) 1240 and output device(s) 1250 may be incorporated in a single system or device, such as a touch screen or a virtual reality system.

The communication connection(s) 1260 enables communication over a communication medium to another computing entity. Additionally, functionality of the components of the device 1200 may be implemented in a single computing machine or in a plurality of computing machines that are able to communicate over communication connections. Thus, the device 1200 may operate in a networked environment using logical connections to one or more other servers, network PCs, or another common network node. By way of example, and not limitation, communication media include wired or wireless networking techniques.

In accordance with implementations of the subject matter described herein, a controlling unit 210 may be executed on the device 1200 to provide ranked documents in response to an inquiry to a document repository.

Now only for the purpose of illustration, some example implemented will be listed below.

In some implementations, the subject matter described herein may be embodied as a device. The device comprises a processing unit and a memory. The memory is coupled to the processing unit and stores instructions for execution by the processing unit. The instructions, when executed by the processing unit, cause the device to perform acts comprising: receiving a write request to a redundant storage system; determining a dataset that is to be written into the redundant storage system by the write request; and logging a portion of the dataset into the redundant storage system for data recovery in case that a fault occurs in the redundant storage system.

In some implementations, the determining a dataset that is to be written into the redundant storage system comprises: determining a first number of data blocks that are to be written into the redundant storage system; and the logging a portion of the dataset into the redundant storage system comprise: determining a second number less than the first number based on a reliability level of the redundant storage system; and logging data associated with the second number of data blocks from the first number of data blocks into the redundant storage system.

In some implementations, the determining a second number based on a reliability level of the redundant storage system comprises: based on the reliability level of the redundant storage system, determining a number of allowed failure storage nodes in the redundant storage system; and determining the second number according to the number of the allowed failure storage nodes.

In some implementations, u represents the first number, l represents the second number, the acts further comprise: in a plurality of phases, updating (u−l) data blocks that are not logged, with an updated version of data associated with the (u−l) data blocks based on the write request.

In some implementations, f represents the number of the allowed failure storage nodes, and the acts further comprise: in a first phase in the plurality of phases, updating, up to (m−f) data blocks that are not logged, with an updated version of data associated with the (m−f) data blocks based on the write request.

In some implementations, the acts further comprise: in a second phase in the plurality of phases, updating, up to $\delta-2*(m-f)$ data blocks that are not logged or updated, with an updated version of data associated with the $\delta-2*(m-f)$ data blocks based on the write request, wherein $\delta=u-l$.

In some implementations, the acts further comprise: in a third phase in the plurality of phases, updating, a remaining portion of the u data blocks, with an updated version of data associated with the remaining portion based on the write request.

In some implementations, the logging data associated with the second number of data blocks from the first number of data blocks into the redundant storage system comprises: in response to the u data blocks being within a stripe in the redundant storage system, logging the data associated with the l data blocks into respective log areas in respective storage nodes of the l data blocks.

In some implementations, the logging the data associated with the l data blocks into respective log areas in respective storage nodes of the l data blocks comprises: determining an original version of the data associated with the l data blocks, and determining an updated version of the data associated with the l data blocks based on the write request; and logging, into the respective log areas in the respective storage nodes of the l data blocks, one version from the original version and the updated version of the data associated with the l data blocks; and maintaining, in the l data blocks, the other version of the data associated with the l data blocks.

In some implementations, the recovering the data in the redundant storage system comprises: in response to a fault occurring in any of f storage nodes in the redundant storage system, determining, from the existing data, a first group of data blocks with the original version and a second group of data blocks with the updated version, respectively; and recovering the data based on a comparison of sizes of the first and second groups.

In some implementations, u represents the first number, l represents the second number, and the logging data associated with the second number of data blocks from the first number of data blocks into the redundant storage system comprises: in response to the u data blocks being within a plurality of stripes in the redundant storage system, with respect to a stripe of the plurality of stripes, determining a sixth number of data blocks that are to be written into the stripe, wherein $u_i$ represents the sixth number; determining a seventh number less than $u_i$ based on the reliability level of the redundant storage system, wherein $l_i$ represents the seven number; and logging data associated with $l_i$ data blocks from the $u_i$ data blocks into the redundant storage system.

In some implementations, the acts further comprise: with respect to the stripe of the plurality of stripes, determining an original version of the data associated with the $l_i$ data blocks, and determining an updated version of the data associated with the $l_i$ data blocks based on the write request; and logging, into the respective log areas in the respective storage nodes of the $l_i$ data blocks in the stripe, one version from the original version and the updated version of the data associated with the $l_i$ data blocks; and maintaining, in the $l_i$ data blocks, the other version of the data associated with the $l_i$ data blocks.

In some implementations, f represents the number, and the acts further comprise: with respect to the stripe of the plurality of stripes, updating, up to (m–f) data blocks that are not logged, with an updated version of data associated with the (m–f) data blocks based on the write request.

In some implementations, the acts further comprise: with respect to the stripe of the plurality of stripes, updating, a remaining portion of the $u_i$ data blocks, with an updated version of data associated with the remaining portion based on the write request.

In some implementations, the recovering the data in the redundant storage system comprises any of: with respect to the stripe of the plurality of stripes, determining from the existing data a first group of data blocks with the original version and a second group of data blocks with the updated version, respectively; and recovering the data based on a comparison of sizes of the first and second groups that are determined with respect to the stripe of the plurality of stripes.

In some implementations, the subject matter described herein may be embodied as a computer-implemented method comprising: receiving a write request to a redundant storage system; determining a dataset that is to be written into the redundant storage system by the write request; and logging a portion of the dataset into the redundant storage system for data recovery in case that a fault occurs in the redundant storage system.

In some implementations, the determining a dataset that is to be written into the redundant storage system comprises: determining a first number of data blocks that are to be written into the redundant storage system; and the logging a portion of the dataset into the redundant storage system comprise: determining a second number less than the first number based on a reliability level of the redundant storage system; and logging data associated with the second number of data blocks from the first number of data blocks into the redundant storage system.

In some implementations, the determining a second number based on a reliability level of the redundant storage system comprises: based on the reliability level of the redundant storage system, determining a number of allowed failure storage nodes in the redundant storage system; and determining the second number according to the number of the allowed failure storage nodes.

In some implementations, u represents the first number, l represents the second number, the method further comprises: in a plurality of phases, updating (u–l) data blocks that are not logged, with an updated version of data associated with the (u–l) data blocks based on the write request.

In some implementations, f represents the number of the allowed failure storage nodes, and the method further comprises: in a first phase in the plurality of phases, updating, up to (m–f) data blocks that are not logged, with an updated version of data associated with the (m–f) data blocks based on the write request.

In some implementations, the method further comprises: in a second phase in the plurality of phases, updating, up to $\delta-2*(m-f)$ data blocks that are not logged or updated, with an updated version of data associated with the $\delta-2*(m-f)$ data blocks based on the write request, wherein $\delta=u-l$.

In some implementations, the method further comprises: in a third phase in the plurality of phases, updating, a remaining portion of the u data blocks, with an updated version of data associated with the remaining portion based on the write request.

In some implementations, the logging data associated with the second number of data blocks from the first number of data blocks into the redundant storage system comprises: in response to the u data blocks being within a stripe in the redundant storage system, logging the data associated with the l data blocks into respective log areas in respective storage nodes of the l data blocks.

In some implementations, the logging the data associated with the l data blocks into respective log areas in respective storage nodes of the l data blocks comprises: determining an original version of the data associated with the l data blocks, and determining an updated version of the data associated with the l data blocks based on the write request; and logging, into the respective log areas in the respective storage nodes of the l data blocks, one version from the original version and the updated version of the data associated with the l data blocks; and maintaining, in the l data blocks, the other version of the data associated with the l data blocks.

In some implementations, the recovering the data in the redundant storage system comprises: in response to a fault occurring in any of f storage nodes in the redundant storage system, determining, from the existing data, a first group of data blocks with the original version and a second group of data blocks with the updated version, respectively; and recovering the data based on a comparison of sizes of the first and second groups.

In some implementations, u represents the first number, l represents the second number, and the logging data associated with the second number of data blocks from the first number of data blocks into the redundant storage system comprises: in response to the u data blocks being within a plurality of stripes in the redundant storage system, with respect to a stripe of the plurality of stripes, determining a sixth number of data blocks that are to be written into the stripe, wherein $u_i$ represents the sixth number; determining a seventh number less than $u_i$ based on the reliability level of the redundant storage system, wherein $l_i$ represents the seven number; and logging data associated with $l_i$ data blocks from the $u_i$ data blocks into the redundant storage system.

In some implementations, the method further comprises: with respect to the stripe of the plurality of stripes, determining an original version of the data associated with the $l_i$ data blocks, and determining an updated version of the data associated with the $l_i$ data blocks based on the write request; and logging, into the respective log areas in the respective storage nodes of the $l_i$ data blocks in the stripe, one version from the original version and the updated version of the data associated with the $l_i$ data blocks; and maintaining, in the $l_i$ data blocks, the other version of the data associated with the $l_i$ data blocks.

In some implementations, f represents the number, and the method further comprises: with respect to the stripe of the plurality of stripes, updating, up to (m−f) data blocks that are not logged, with an updated version of data associated with the (m−f) data blocks based on the write request.

In some implementations, the method further comprises: with respect to the stripe of the plurality of stripes, updating, a remaining portion of the $u_i$ data blocks, with an updated version of data associated with the remaining portion based on the write request.

In some implementations, the recovering the data in the redundant storage system comprises any of: with respect to the stripe of the plurality of stripes, determining from the existing data a first group of data blocks with the original version and a second group of data blocks with the updated version, respectively; and recovering the data based on a comparison of sizes of the first and second groups that are determined with respect to the stripe of the plurality of stripes.

In some implementations, the subject matter described herein may be embodied as a computer program product. The computer program product may be tangibly stored on a non-transient machine-readable medium and comprises machine-executable instructions. The instructions, when executed on an electronic device, cause the electronic device to: receive a write request to a redundant storage system; determine a dataset that is to be written into the redundant storage system by the write request; and log a portion of the dataset into the redundant storage system for data recovery in case that a fault occurs in the redundant storage system.

In some implementations, the instructions further cause the electronic device to: determine a first number of data blocks that are to be written into the redundant storage system; determine a second number less than the first number based on a reliability level of the redundant storage system; and log data associated with the second number of data blocks from the first number of data blocks into the redundant storage system.

In some implementations, the instructions further cause the electronic device to: based on the reliability level of the redundant storage system, determine a number of allowed failure storage nodes in the redundant storage system; and determine the second number according to the number of the allowed failure storage nodes.

In some implementations, u represents the first number, l represents the second number, and the instructions further cause the electronic device to: in a plurality of phases, update (u−l) data blocks that are not logged, with an updated version of data associated with the (u−l) data blocks based on the write request.

In some implementations, f represents the number of the allowed failure storage nodes, and the instructions further cause the electronic device to: in a first phase in the plurality of phases, update, up to (m−f) data blocks that are not logged, with an updated version of data associated with the (m−f) data blocks based on the write request.

In some implementations, the instructions further cause the electronic device to: in a second phase in the plurality of phases, update, up to δ−2*(m−f) data blocks that are not logged or updated, with an updated version of data associated with the δ−2*(m−f) data blocks based on the write request, wherein δ=u−l.

In some implementations, the instructions further cause the electronic device to: in a third phase in the plurality of phases, update, a remaining portion of the u data blocks, with an updated version of data associated with the remaining portion based on the write request.

In some implementations, the instructions further cause the electronic device to: in response to the u data blocks being within a stripe in the redundant storage system, log the data associated with the l data blocks into respective log areas in respective storage nodes of the l data blocks.

In some implementations, the instructions further cause the electronic device to: determine an original version of the data associated with the l data blocks, and determine an updated version of the data associated with the l data blocks based on the write request; and log, into the respective log areas in the respective storage nodes of the l data blocks, one version from the original version and the updated version of the data associated with the l data blocks; and maintain, in the l data blocks, the other version of the data associated with the l data blocks.

In some implementations, the instructions further cause the electronic device to: in response to a fault occurring in any of f storage nodes in the redundant storage system, determine, from the existing data, a first group of data blocks with the original version and a second group of data blocks with the updated version, respectively; and recover the data based on a comparison of sizes of the first and second groups.

In some implementations, u represents the first number, l represents the second number, and the instructions further cause the electronic device to: in response to the u data blocks being within a plurality of stripes in the redundant storage system, with respect to a stripe of the plurality of stripes, determine a sixth number of data blocks that are to be written into the stripe, wherein $u_i$ represents the sixth number; determine a seventh number less than $u_i$ based on the reliability level of the redundant storage system, wherein $l_i$ represents the seven number; and log data associated with $l_i$ data blocks from the $u_i$ data blocks into the redundant storage system.

In some implementations, the instructions further cause the electronic device to: with respect to the stripe of the plurality of stripes, determine an original version of the data associated with the $l_i$ data blocks, and determine an updated version of the data associated with the $l_i$ data blocks based on the write request; and log, into the respective log areas in the respective storage nodes of the $l_i$ data blocks in the stripe, one version from the original version and the updated version of the data associated with the $l_i$ data blocks; and maintain, in the $l_i$ data blocks, the other version of the data associated with the $l_i$ data blocks.

In some implementations, f represents the number, and the instructions further cause the electronic device to: with respect to the stripe of the plurality of stripes, update, up to (m−f) data blocks that are not logged, with an updated version of data associated with the (m−f) data blocks based on the write request.

In some implementations, the instructions further cause the electronic device to: with respect to the stripe of the plurality of stripes, update, a remaining portion of the $u_i$ data blocks, with an updated version of data associated with the remaining portion based on the write request.

In some implementations, the instructions further cause the electronic device to: with respect to the stripe of the plurality of stripes, determine from the existing data a first group of data blocks with the original version and a second group of data blocks with the updated version, respectively; and recover the data based on a comparison of sizes of the first and second groups that are determined with respect to the stripe of the plurality of stripes.

In general, the various example implementations may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example implementations of the subject matter described herein are illustrated and described as block diagrams, flowcharts, or using some other pictorial representation, it will be to be understood that the blocks, apparatus, systems, techniques or methods described herein may be implemented in, as non-limiting examples, hardware, software, firmware, special purpose circuits or logic, general purpose hardware or controller or other computing devices, or some combination thereof.

In the context of the subject matter described herein, a machine readable medium may be any tangible medium that can contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the subject matter described herein may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions or operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in a plurality of implementations separately or in any suitable sub-combination.

Various modifications, adaptations to the foregoing example implementations of this disclosure may become apparent to those skilled in the relevant arts in view of the foregoing description, when read in conjunction with the accompanying drawings. Any and all modifications will still fall within the scope of the non-limiting and example implementations of this disclosure. Furthermore, other implementations of the disclosures set forth herein will come to mind to one skilled in the art to which these implementations of the disclosure pertain having the benefit of the teachings presented in the foregoing descriptions and the drawings.

Therefore, it will be to be understood that the implementations of the disclosure are not to be limited to the specific implementations disclosed and that modifications and other implementations are intended to be included within the scope of the appended claims. Although specific terms are used herein, they are used in a generic and descriptive sense only and not for purposes of limitation.

What is claimed is:

1. A device, comprising:
a processing unit; and
a memory coupled to the processing unit and storing instructions for execution by the processing unit, the instructions, when executed by the processing unit, causing the device to perform acts comprising:
receiving, by a redundant storage system, a write request to write a dataset to the redundant storage system, wherein the redundant storage system is implemented using a redundant array of non-volatile main memory and natively supports crash consistency and failure tolerance; and
as part of the crash consistency:
determining a first number of data blocks for storing the dataset in the redundant storage system;
logging a subset of the dataset in a second number of data blocks of the redundant storage system for data recovery in case that a fault occurs in the redundant storage system, wherein the second number of data blocks is a subset of the first number of data blocks; and
writing the dataset in the first number of data blocks into the redundant storage system.

2. The device of claim 1, further comprising determining the second number of data blocks, wherein the second number is based on a reliability level of the redundant storage system.

3. The device of claim 2, wherein determining the second number based on the reliability level of the redundant storage system comprises:
based on the reliability level of the redundant storage system:

determining a number of allowed failure storage nodes in the redundant storage system; and determining the second number according to the number of the allowed failure storage nodes.

4. The device of claim 3, wherein:

u represents the first number of data blocks and l represents the second number of data blocks; and the memory stores further instructions for:

in a plurality of phases, updating (u−l) data blocks that are not logged, with an updated version of data associated with they (u−l) data blocks based on the write request.

5. The device of claim 4, wherein:

f represents the number of the allowed failure storage nodes and m represents a number of storage nodes for storing parity; and the memory stores further instructions for:

in a first phase in the plurality of phases, updating, up to (m−f) data blocks that are not logged, with an updated version of data associated with the (m−f) data blocks based on the write request.

6. The device of claim 5, wherein the memory stores further instructions for:

in a second phase in the plurality of phases, updating, up to δ−2*(m−f) data blocks that are not logged or updated, with an updated version of data associated with the δ−2*(m−f) data blocks based on the write request, wherein δ=u−l.

7. The device of claim 6, wherein the memory stores further instructions for:

in a third phase in the plurality of phases, updating, a remaining portion of the data blocks, with an updated version of data associated with the remaining portion based on the write request.

8. The device of claim 7, wherein logging the data in the second number of data blocks into the redundant storage system comprises:

in response to the u data blocks being within a stripe in the redundant storage system, logging data associated with the l data blocks into respective log areas in respective storage nodes of the l data blocks.

9. The device of claim 8, wherein logging the data associated with the l data blocks into respective log areas in respective storage nodes of the l data blocks comprises:

determining an original version of the data associated with the l data blocks;

determining an updated version of the data associated with the l data blocks based on the write request;

logging, into the respective log areas in the respective storage nodes of the l data blocks, one version from the original version and the updated version of the data associated with the l data blocks; and maintaining, in the l data blocks, the other version of the data associated with the l data blocks.

10. The device of claim 9, wherein the memory stores further instructions for recovering data in the redundant storage system, the recovering comprising:

in response to a fault occurring in any of f storage nodes in the redundant storage system, determining, from existing data, a first group of data blocks with the original version and a second group of data blocks with the updated version, respectively; and recovering the data based on a comparison of sizes of the first and second groups.

11. The device of claim 8, wherein the memory stores further instructions for:

with respect to the stripe of the plurality of stripes;

determining an original version of the data associated with the $l_i$ data blocks;

determining an updated version of the data associated with the $l_i$ data blocks based on the write request;

logging, into the respective log areas in the respective storage nodes of the $l_i$ data blocks in the stripe, one version from the original version and the updated version of the data associated with the $l_i$ data blocks; and maintaining, in the $l_i$ data blocks, the other version of the data associated with the $l_i$ data blocks.

12. The device of claim 11, wherein:

f represents the number of the allowed failure storage nodes and m represents a number of storage nodes for storing parity; and the memory stores further instructions for:

with respect to the stripe of the plurality of stripes, updating, up to (m−f) data blocks that are not logged, with an updated version of data associated with the (m−f) data blocks based on the write request.

13. The device of claim 12, wherein the memory stores further instructions for:

with respect to the stripe of the plurality of stripes, updating, a remaining portion of the $u_i$ data blocks, with an updated version of data associated with the remaining portion based on the write request.

14. The device of claim 12, wherein the memory stores further instructions for recovering data in the redundant storage system, the recovering comprising any of:

with respect to the stripe of the plurality of stripes, determining from existing data a first group of data blocks with the original version and a second group of data blocks with the updated version, respectively; or recovering the data based on a comparison of sizes of the first and second groups that are determined with respect to the stripe of the plurality of stripes.

15. The device of claim 3, wherein:

u represents the first number of data blocks and l represents the second number of data blocks; and logging data associated with the second number of data blocks into the redundant storage system comprises:

in response to the u data blocks being within a plurality of stripes in the redundant storage system, with respect to a stripe of the plurality of stripes:

determining a sixth number of data blocks that are to be written into the stripe, wherein $u_i$ represents the sixth number;

determining a seventh number less than $u_i$ based on the reliability level of the redundant storage system, wherein $l_i$ represents the seventh number; and logging data associated with $l_i$ data blocks from the $u_i$ data blocks into the redundant storage system.

16. The device of claim 1, wherein the second number of data blocks is randomly selected from the first number of data blocks.

17. The device of claim 1, wherein the second number of data blocks corresponds to a least one of:

a number of first data blocks in the first number of data blocks; or a number of last data blocks in the first number of data blocks.

18. The device of claim 1, wherein the redundant storage system:

is implemented as part of a file system or a database system; and natively supports the crash consistency and the failure tolerance without reliance on the file system or the database system.

19. A computer-implemented method comprising:
receiving, by a redundant storage system, a write request to write a dataset to the redundant storage system, wherein the redundant storage system is implemented using a redundant array of non-volatile main memory and natively supports crash consistency and failure tolerance, the crash consistency enabling recovery of the dataset if a fault occurs during a write process of the dataset to the redundant storage system; and
as part of the crash consistency:
  determining a first number of data blocks for storing the dataset in the redundant storage system by the write request;
  logging a subset of the dataset in a second number of data blocks of the redundant storage system for data recovery in case that a fault occurs in the redundant storage system, wherein the second number of data blocks is a subset of the first number of data blocks; and
  writing the dataset in the first number of data blocks into the redundant storage system.

20. A computer program product being tangibly stored on a non-transient machine-readable medium and comprising machine-executable instructions, the instructions, when executed on an electronic device, causing the electronic device to:
receive, by a redundant storage system, a write request to write a dataset to the redundant storage system, wherein the redundant storage system is implemented using a redundant array of non-volatile main memory and natively supports crash consistency and failure tolerance, the crash consistency enabling recovery of the dataset if a fault occurs during a write process of the dataset to the redundant storage system, the failure tolerance enabling recovery of data previously stored in one or more storage nodes associated with the redundant storage system; and
as part of the crash consistency:
  determine a first number of data blocks for storing the dataset in the redundant storage system;
  log a subset of the dataset in a second number of data blocks of the redundant storage system for data recovery in case that a fault occurs in the redundant storage system, wherein the second number of data blocks is a subset of the first number of data blocks; and
  write the dataset in the first number of data blocks into the redundant storage system.

\* \* \* \* \*